United States Patent
Pezeshki et al.

(10) Patent No.: US 12,244,542 B2
(45) Date of Patent: Mar. 4, 2025

(54) UE INDICATION OF NULL TONE PLACEMENT FOR DEMODULATION

(71) Applicant: QUALCOMM Incorporated, San Diego, CA (US)

(72) Inventors: Hamed Pezeshki, San Diego, CA (US); Tao Luo, San Diego, CA (US); Wooseok Nam, San Diego, CA (US); Mohamed Marzban, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 17/410,926

(22) Filed: Aug. 24, 2021

(65) Prior Publication Data
US 2023/0068633 A1  Mar. 2, 2023

(51) Int. Cl.
*H04L 5/00* (2006.01)
*H04B 17/345* (2015.01)
*H04L 27/14* (2006.01)

(52) U.S. Cl.
CPC ......... *H04L 5/0094* (2013.01); *H04B 17/345* (2015.01); *H04L 27/14* (2013.01)

(58) Field of Classification Search
CPC ..... H04L 5/0094; H04L 27/14; H04L 5/0053; H04L 5/0042; H04L 5/0073; H04L 5/0007; H04L 5/0085; H04B 17/345
See application file for complete search history.

(56) References Cited

U.S. PATENT DOCUMENTS

| | | | |
|---|---|---|---|
| 2013/0242761 A1* | 9/2013 | Park | H04L 43/08 370/252 |
| 2014/0254419 A1 | 9/2014 | Chun et al. | |
| 2016/0128072 A1* | 5/2016 | Rajagopal | H04L 5/0091 370/329 |
| 2017/0264466 A1* | 9/2017 | Hosseini | H04L 25/021 |
| 2021/0344439 A1* | 11/2021 | Kuchi | H04L 1/0026 |

OTHER PUBLICATIONS

International Search Report and Written Opinion—PCT/US2022/038938—ISA/EPO—Nov. 18, 2022.
Liu S., et al., "Impulsive Noise Recovery and Elimination: A Sparse Machine Learning Based Approach", IEEE Transactions on Vehicular Technology, IEEE, USA, vol. 68, No. 3, Mar. 1, 2019, pp. 2306-2315, XP011714915, 10 Pages, Section III, Subsection A, p. 2309, Left Column, Last Two Paragraphs.

* cited by examiner

*Primary Examiner* — Huy D Vu
*Assistant Examiner* — Robert Ma
(74) *Attorney, Agent, or Firm* — Procopio, Cory, Hargreaves & Savitch LLP/QUALCOMM Incorporated

(57) ABSTRACT

Apparatus, methods, and computer-readable media for facilitating UE indication of null tone placement for demodulation are disclosed herein. An example method for wireless communication at a UE includes measuring one or more downlink transmissions in one or more frequency subcarriers received from a base station over a time period. The example method also includes transmitting, to the base station, a null tone indication indicating one or more locations for one or more null tones, the one or more locations for the one or more null tones based at least in part on measurements performed on the one or more downlink transmissions received over the time period.

39 Claims, 12 Drawing Sheets

UE INDICATION OF NULL TONE PLACEMENT FOR DEMODULATION

INTRODUCTION

The present disclosure relates generally to communication systems, and more particularly, to machine-learning based techniques for resource placement.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at a user equipment (UE) is provided. The method may include measuring one or more downlink transmissions in one or more frequency subcarriers received from a base station over a time period. The example method may also include transmitting, to the base station, a null tone indication indicating one or more locations for one or more null tones, the one or more locations for the one or more null tones based at least in part on measurements performed on the one or more downlink transmissions received over the time period.

In another aspect of the disclosure, an apparatus for wireless communication is provided. The apparatus may be a UE that includes a memory and at least one processor coupled to the memory, the memory and the at least one processor configured to measure one or more downlink transmissions in one or more frequency subcarriers received from a base station over a time period. The memory and the at least one processor may also be configured to transmit, to the base station, a null tone indication indicating one or more locations for one or more null tones, the one or more locations for the one or more null tones based at least in part on measurements performed on the one or more downlink transmissions received over the time period.

In another aspect of the disclosure, an apparatus for wireless communication at a UE is provided. The apparatus may include means for measuring one or more downlink transmissions in one or more frequency subcarriers received from a base station over a time period. The example apparatus may also include means for transmitting, to the base station, a null tone indication indicating one or more locations for one or more null tones, the one or more locations for the one or more null tones based at least in part on measurements performed on the one or more downlink transmissions received over the time period.

In another aspect of the disclosure, a non-transitory computer-readable storage medium storing computer executable code for wireless communication at a UE is provided. The code, when executed, may cause a processor to measure one or more downlink transmissions in one or more frequency subcarriers received from a base station over a time period. The example code, when executed, may also cause the processor to transmit, to the base station, a null tone indication indicating one or more locations for one or more null tones, the one or more locations for the one or more null tones based at least in part on measurements performed on the one or more downlink transmissions received over the time period.

In another aspect of the disclosure, a method of wireless communication at a base station is provided. The method may include transmitting, to a UE, one or more downlink transmissions in one or more frequency subcarriers over a time period. The example method may also include receiving, from the UE, a null tone indication indicating one or more locations for one or more null tones. Additionally, the example method may include transmitting, to the UE, one or more subsequent downlink transmissions, the one or more subsequent downlink transmissions including at least one null tone at the one or more locations for the one or more null tones.

In another aspect of the disclosure, an apparatus for wireless communication is provided. The apparatus may be a base station that includes a memory and at least one processor coupled to the memory, the memory and the at least one processor configured to transmit, to a UE, one or more downlink transmissions in one or more frequency subcarriers over a time period. The memory and the at least one processor may also be configured to receive, from the UE, a null tone indication indicating one or more locations for one or more null tones. Additionally, the memory and the at least one processor may be configured to transmit, to the UE, one or more subsequent downlink transmissions, the one or more subsequent downlink transmissions including at least one null tone at the one or more locations for the one or more null tones.

In another aspect of the disclosure, an apparatus for wireless communication at a base station is provided. The apparatus may include means for transmitting, to a UE, one or more downlink transmissions in one or more frequency subcarriers over a time period. The example apparatus may also include means for receiving, from the UE, a null tone indication indicating one or more locations for one or more null tones. Additionally, the example apparatus may include means for transmitting, to the UE, one or more subsequent downlink transmissions, the one or more subsequent downlink transmissions including at least one null tone at the one or more locations for the one or more null tones.

In another aspect of the disclosure, a non-transitory computer-readable storage medium storing computer executable code for wireless communication at a base station is provided. The code, when executed, may cause a processor to transmit, to a UE, one or more downlink transmissions in one or more frequency subcarriers over a time period. The example code, when executed, may also cause the processor to receive, from the UE, a null tone indication indicating one or more locations for one or more null tones. Additionally, the example code, when executed, may cause the processor to transmit, to the UE, one or more subsequent downlink transmissions, the one or more subsequent downlink transmissions including at least one null tone at the one or more locations for the one or more null tones.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
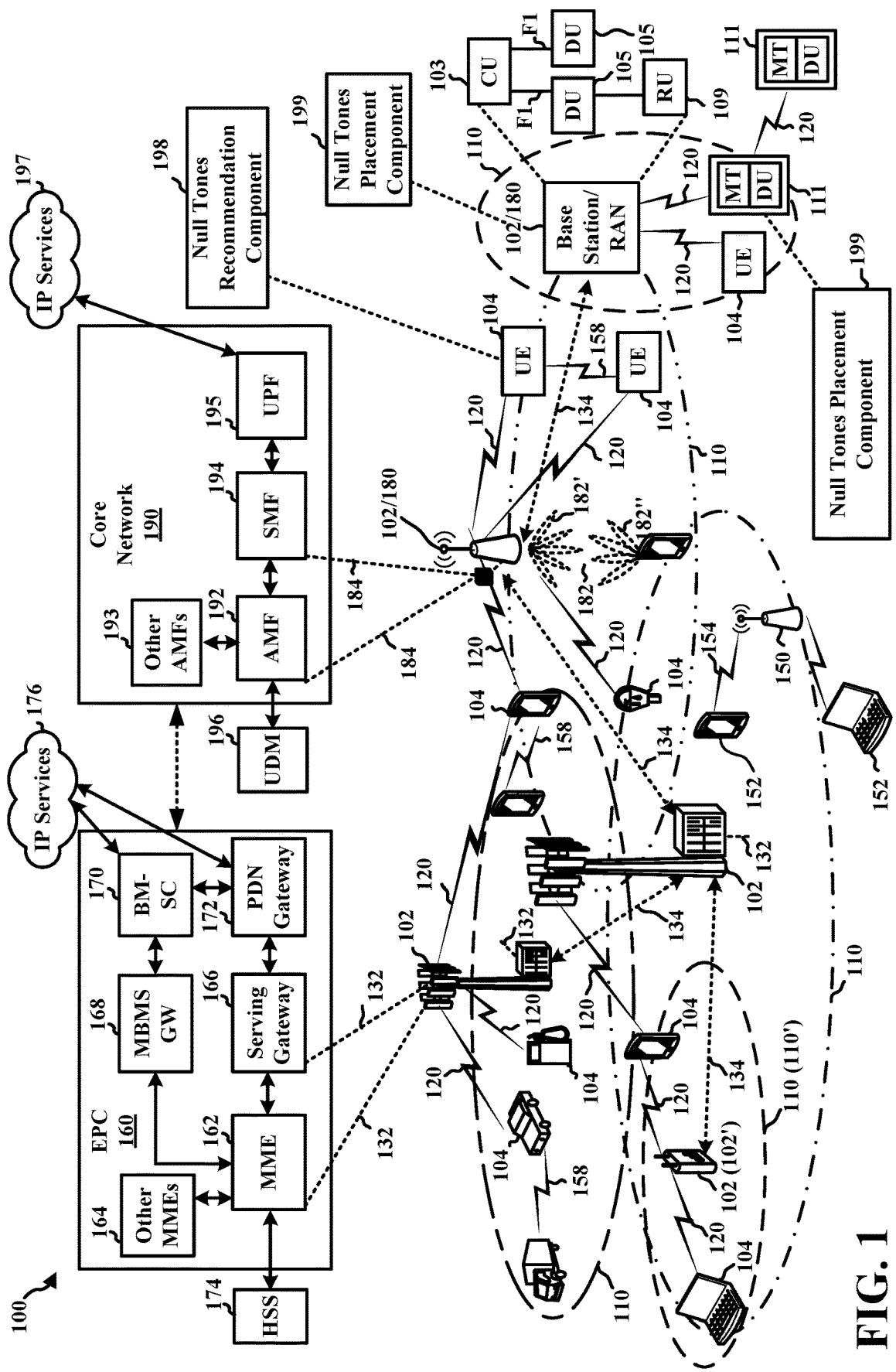
FIG. 1 is a diagram illustrating an example of a wireless communications system and an access network.

In a wireless communication environment, a set of resources may be allocated for uplink (UL) and/or downlink (DL) transmissions between a UE and a base station. For some deployment environments of the UE, the allocated resources may result in interference at the UE. A UE may use demodulation reference signals (DM-RS) to measure channel conditions and to help demodulate the channel. For example, the UE may use DM-RS for a DL control channel to estimate the propagation channel experienced by the DL control channel. The UE may use the resultant information to help demodulate the DL control channel and to subsequently decode downlink control information. The configuration (or placement) of the DM-RS may be semi-static. In some examples, the semi-static placement of the DM-RS may not be configured to address the different conditions of a particular deployment environment of the UE. For example, the semi-static placement of the DM-RS may be usable by the UE in an outdoor environment, but may be unusable by the UE in an indoor environment. In another example, the semi-static placement of the DM-RS may be usable by a UE that is located near a base station, but may result in interference for a UE located at a cell edge. Thus, it may be appreciated that the semi-static placement of the DM-RS may result in resources that are wasted as the UE may be unable to use the DM-RS to measure channel conditions, for example, due to the particular deployment environment of the UE.

As disclosed herein, over time, the UE may utilize a neural network to learn resource elements that can be used for interference measurement for demodulation. The UE may indicate the learned resource elements to the base station, which may use the indicated resource elements for determining resources on which to schedule null tones for reception at the UE. The one or more resource elements may be different than the semi-static placement of the DM-RS. Additionally, the one or more resource elements may be determined to improve a metric of interest. For example, the locations of the one or more resource elements may be selected to improve throughput for data and control information.

For example, the UE may receive downlink transmissions from the base station over a time period and perform measurements on the received downlink transmissions. The received downlink transmissions may comprise one or more tones or frequency subcarriers. The tones may be used for reference signals, control information, and/or data. In some examples, the tones may be null tones. As used herein, the term "null tone" may refer to a non-transmission on a resource element.

As disclosed herein, the UE may apply a machine-learning algorithm (sometimes referred to as a "machine-learning model") to learn resource elements associated with interference at the UE. A machine-learning model, such as an artificial neural network (ANN), may include an interconnected group of artificial neurons (e.g., neuron models), and may be a computational device or may represent a method to be performed by a computational device. The connections of the neuron models may be modeled as weights. Machine-learning models may provide predictive modeling, adaptive control, and other applications through training via a dataset. The model may be adaptive based on external or internal information that is processed by the machine-learning model. Machine-learning may provide non-linear statistical data model or decision making and may model complex relationships between input data and output information.

A machine-learning model or neural network may be trained. For example, a machine-learning model may be trained based on supervised learning or reinforcement learning. During training, the machine-learning model may be provided with input that the model uses to compute to produce an output. The actual output may be compared to a target output, and the difference may be used to adjust parameters (such as weights and biases) of the machine-learning model in order to provide an output closer to the target output. Before training, the output may be incorrect or less accurate, and an error, or difference, may be calculated between the actual output and the target output. The weights of the machine-learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

While the UE may provide channel state information (CSI) feedback to the base station, such CSI feedback may not be as granular compared to what may be determined by the UE. Additionally, the CSI feedback may comprise a subset of information or a post-processed version of the information available at the UE. Accordingly, by enabling the UE to learn resource elements associated with interference at the UE, the UE may indicate proposed tone locations for null tones that can be used for interference measurement for demodulation. The proposed tone locations may be based on an increased granularity, which may reduce resource waste via a more precise indication of resources. For example, the UE may use the null tones to compute a recurrent neural network (RNN) for demodulation. The RNN may comprise a correlation of a noise matrix generated based on measurements associated with the null tones. Thus, it may be appreciated that the aspects disclosed herein may enable a UE to determine and provide a recommendation for null tone placement, which may facilitate improving communication performance, for example, by enabling the UE to use the null tones for demodulation. In such scenarios, communication at the UE may be associated with higher data rates, increased capacity, and/or improved spectral efficiency.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100 including base stations 102 and 180 and UEs 104. In certain aspects, a device in communication with a base station, such as a UE 104, may be configured to manage one or more aspects of wireless communication by providing information about a set of recommended resource elements to another wireless device, such as a base station 102/180, for communication with the UE. For example, the UE 104 may include a null tones recommendation component 198 configured to measure one or more downlink transmissions in one or more frequency subcarriers received from a base station over a time period. The example null tones recommendation component 198 may also be configured to transmit, to the base station, a null tone indication indicating one or more locations for one or more null tones. The example one or more locations for the one or more null tones may be based at least in part on measurements performed on the one or more downlink transmissions received over the time period.

In another configuration, a base station, such as the base stations 102/180, may be configured to manage or more aspects of wireless communication by transmitting null tones to a UE based on a set of resource elements indicated by the UE. For example, the base stations 102/180 may include a null tones placement component 199 configured to transmit, to a UE, one or more downlink transmissions in one or more frequency subcarriers over a time period. The example null tones placement component 199 may also be configured to receive, from the UE, a null tone indication indicating one or more locations for one or more null tones. Additionally, the example null tones placement component 199 may be configured to transmit, to the UE, one or more subsequent downlink transmissions, the one or more subsequent downlink transmissions including at least one null tone at the one or more locations for the one or more null tones.

The aspects disclosed herein may enable a UE to determine and provide a recommendation for null tone placement, which may facilitate improving communication performance, for example, by enabling the UE to use the null tones for demodulation.

Although the following description provides examples directed to 5G NR, the concepts described herein may be applicable to other similar areas, such as LTE, LTE-A, CDMA, GSM, and/or other wireless technologies, in which a UE may perform demodulation.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., an X2 interface). The first backhaul links 132, the second backhaul links 184 (e.g., an X2 interface), and the third backhaul links 134 may be wired or wireless.

In some aspects, a base station 102 or 180 may be referred to as a RAN and may include aggregated or disaggregated components. As an example of a disaggregated RAN, a base station may include a central unit (CU), one or more distributed units (DU), and/or one or more remote units (RU). For example, the example of FIG. 1 illustrates a disaggregated RAN including a CU 103, a DU 105, an/or an RU 109. In some examples, a RAN may be disaggregated with a split between the RU 109 and an aggregated CU/DU. In some examples, a RAN may be disaggregated with a split between the CU 103, the DU 105, and the RU 109. In some examples, a RAN may be disaggregated with a split between the CU 103 and an aggregated DU/RU. The CU 103 and the DU 105 may be connected via an F1 interface. The DU 105 and the RU 109 may be connected via a fronthaul interface. A connection between the CU 103 and the DU 105 may be referred to as a midhaul, and a connection between the DU 105 and the RU 109 may be referred to as a fronthaul. The connection between the CU 103 and the core network may be referred to as the backhaul. The RAN may be based on a functional split between various components of the RAN, e.g., between the CU 103, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, the DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. The CU 103 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network, such as the example access network 100 of FIG. 1, may include one or more integrated access and backhaul (IAB) nodes 111 that exchange wireless communication with the UE 104 or another IAB node to provide access and backhaul to a core network. In an IAB network of multiple IAB nodes, an anchor node may be referred to as an IAB donor. The IAB donor may be a base station 102 or 180 that provides access to the core network 190 or the EPC 160 and/or control to the one or more IAB nodes 111. The IAB donor may include the CU 103 and the DU 105. In some examples, the one or more IAB nodes 111 may include the DU 105 and a mobile termination (MT) 113. In some such examples, the DU 105 of the IAB node may operate as a parent node, and the MT 113 may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management.

All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
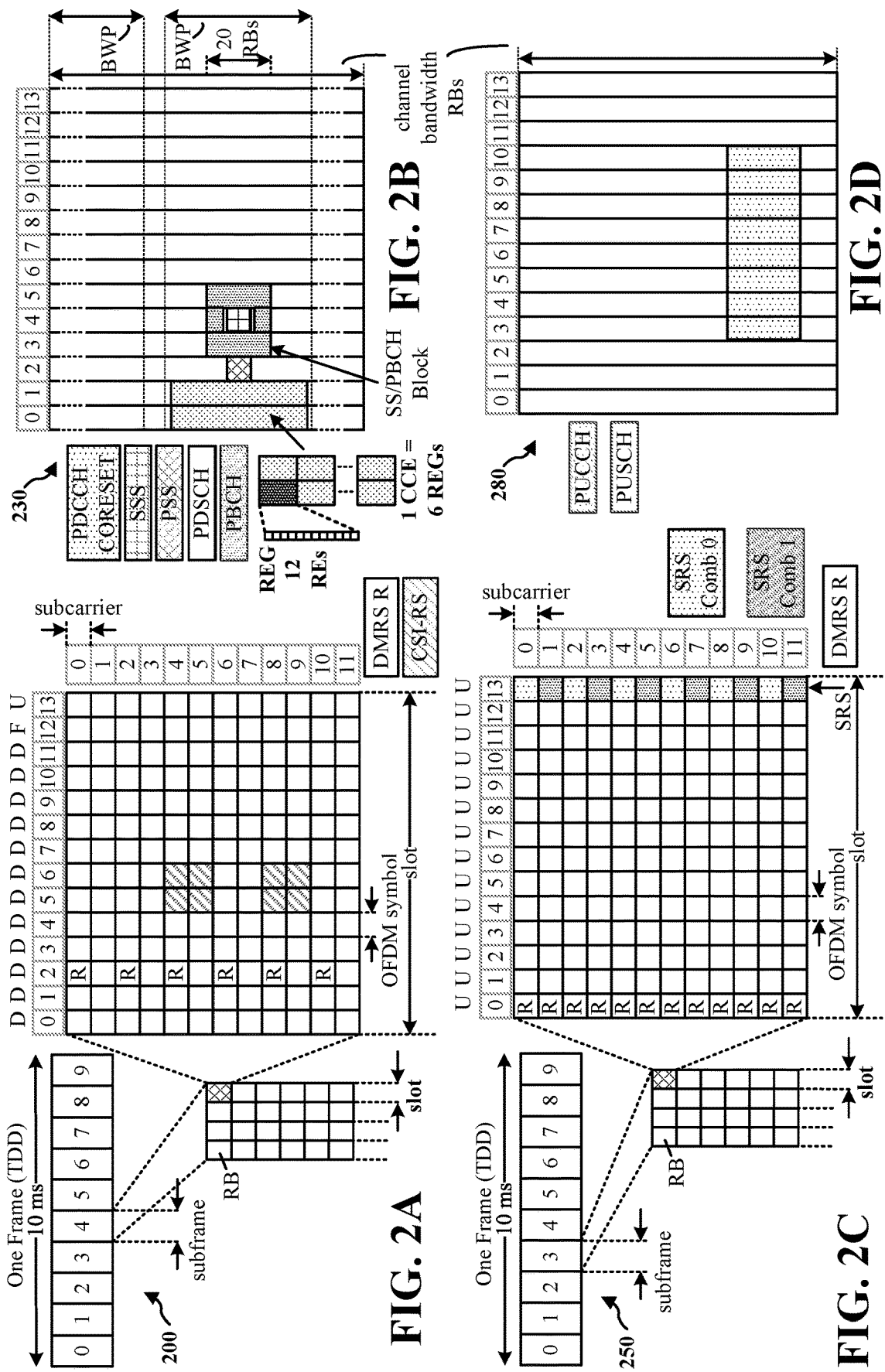
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIG. 2A and FIG. 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP (12 symbols/slot), the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
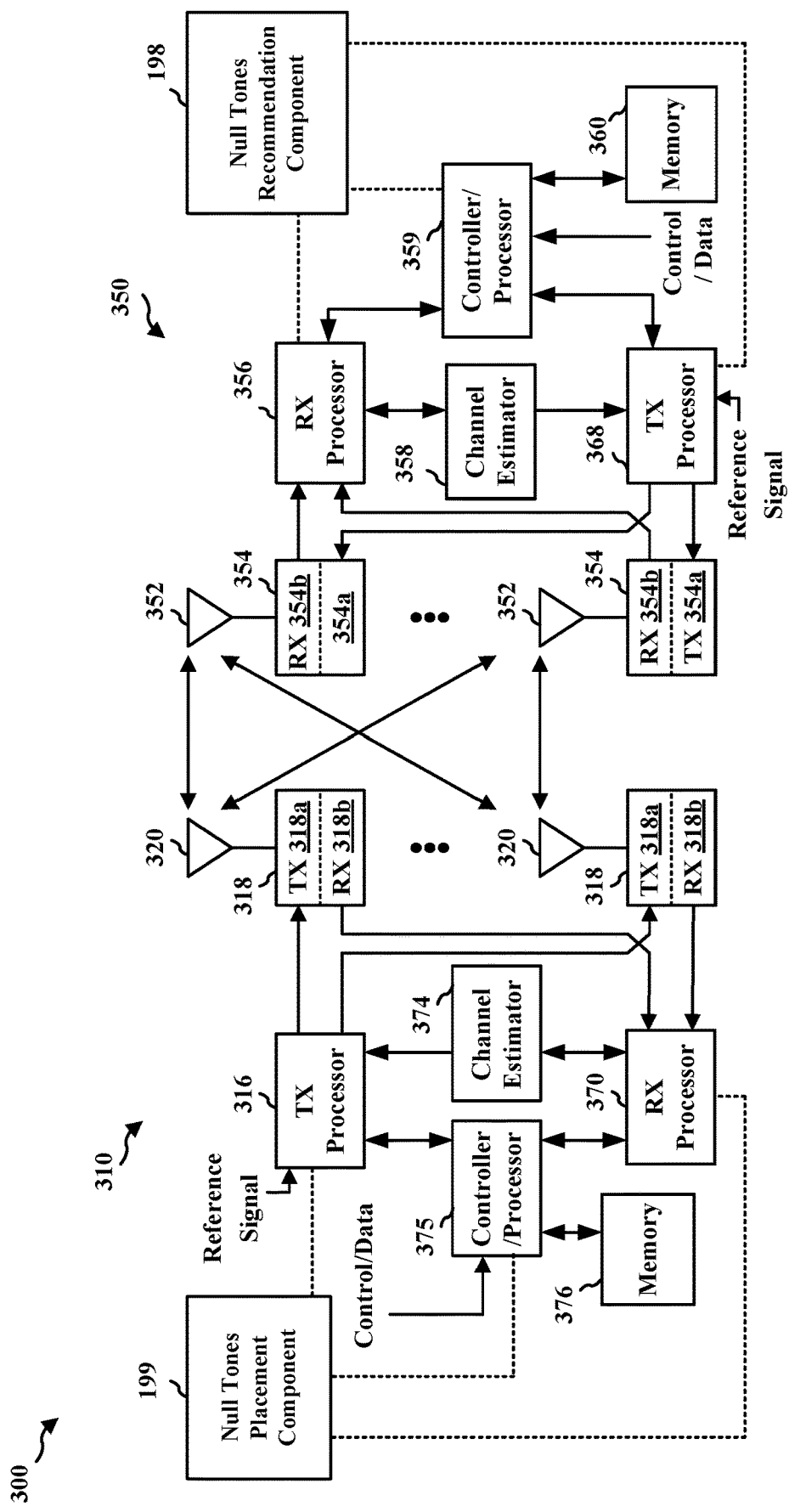
FIG. 3 is a diagram illustrating an example of a base station and a UE in an access network.

FIG. 3 is a block diagram of two wireless communication devices in communication over an access link. In some aspects, the devices may correspond to a base station 310 in communication with a UE 350 in an access network. Although aspects are described for the example of a base station 310 and a UE 350, the aspects may be similarly applied for a transmission reception point (TRP) in communication with a UE 350, or for a UE in communication with another UE.

As shown in FIG. 3, the base station 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate a radio frequency (RF) carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the null tones recommendation component 198 of FIG. 1.

At least one of the TX processor 316, the RX processor 370, and the controller/processor 375 may be configured to perform aspects in connection with the null tones placement component 199 of FIG. 1.

A UE may use machine-learning algorithms, deep-learning algorithms, neural networks, or advanced signal processing methods for aspects of wireless communication, e.g., with a base station, a TRP, another UE, etc. In some aspects described herein, a UE may train one or more neural networks to learn dependence of measured qualities on individual parameters.

Figure 4:
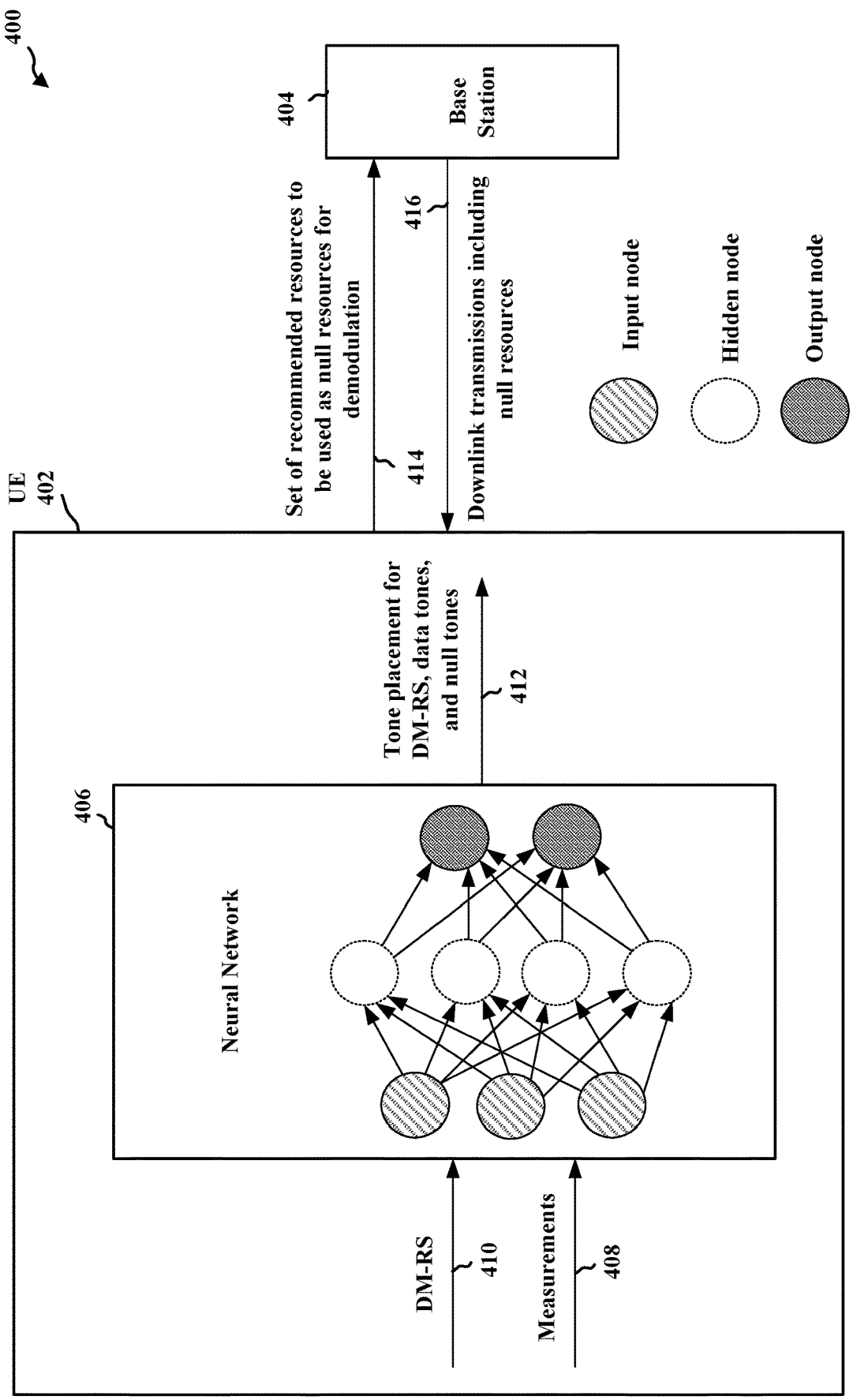
FIG. 4 is a diagram of a UE including a neural network configured to determine a set of recommended resource elements and to provide information about the set of recommended resource elements to another wireless device for communication with the UE.

FIG. 4 illustrates a diagram 400 of a UE 402 that includes a neural network 406 configured to determine a set of resource elements to provide to a second device 404 to be used as null resource elements. The null resource elements may be used by the UE 402 for demodulation. The second device 404 may be a base station, in some examples. The second device 404 may be a TRP in some examples. The second device 404 may be another UE in some examples, e.g., if the communication between the UE 402 and the second device 404 is based on sidelink.

Among others, examples of machine-learning models or neural networks that may be comprised in the UE 402 include artificial neural networks (ANN), such as a recurrent neural network (RNN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; Bayesian networks; genetic algorithms; Deep convolutional networks (DCNs) configured with additional pooling and normalization layers; and Deep belief networks (DBNs).

A machine-learning model, such as an artificial neural network (ANN), may include an interconnected group of artificial neurons (e.g., neuron models), and may be a computational device or may represent a method to be performed by a computational device. The connections of the neuron models may be modeled as weights. Machine-learning models may provide predictive modeling, adaptive control, and other applications through training via a dataset. The model may be adaptive based on external or internal information that is processed by the machine-learning model. Machine-learning may provide non-linear statistical data model or decision making and may model complex relationships between input data and output information.

A machine-learning model may include multiple layers and/or operations that may be formed by concatenation of one or more of the referenced operations. Examples of operations that may be involved include extraction of various features of data, convolution operations, fully connected operations that may be activated or deactivates, compression, decompression, quantization, flattening, etc. As used herein, a "layer" of a machine-learning model may be used to denote an operation on input data. For example, a convolution layer, a fully connected layer, and/or the like may be used to refer to associated operations on data that is input into a layer. A convolution A×B operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine-learning model. Different layers of a machine-learning model may be trained separately.

Machine-learning models may include a variety of connectivity patterns, for example, including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine-learning model or neural network may be trained. For example, a machine-learning model may be trained based on supervised learning or reinforcement learning. During training, the machine-learning model may be provided with input that the model uses to compute to produce an output. The actual output may be compared to a target output, and the difference may be used to adjust parameters (such as weights and biases) of the machine-learning model in order to provide an output closer to the target output. Before training, the output may be incorrect or less accurate, and an error, or difference, may be calculated between the actual output and the target output. The weights of the machine-learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine-learning models may include computational complexity and substantial processing for training the machine-learning model. FIG. 4 illustrates that an example neural network 406 may include a network of interconnected nodes. An output of one node is connected as the input to another node. Connections between nodes may be referred to as edges, and weights may be applied to the connections/edges to adjust the output from one node that is applied as input to another node. Nodes may apply thresholds in order to determine whether, or when, to provide output to a connected node. The output of each node may be calculated as a non-linear function of a sum of the inputs to the node. The neural network 406 may include any number of nodes and any type of connections between nodes. The neural network 406 may include one or more hidden nodes. Nodes may be aggregated into layers, and different layers of the neural network may perform different kinds of transformations on the input. A signal may travel from input at a first layer through the multiple layers of the neural network to output at a last layer of the neural network and may traverse layers multiple times.

As described above, in a wireless communication environment, a set of resources may be allocated for UL transmissions and/or DL transmissions between the UE and the base station. For some deployment environments of the UE, the allocated resources may result in interference at the UE. The UE may use DM-RS to measure channel conditions and to help demodulate the channel. For example, the UE may use DM-RS for a DL control channel to estimate the propagation channel experienced by the DL control channel. The UE may use the resultant information to help demodulate the DL control channel and to subsequently decode downlink control information. The configuration (or placement) of the DM-RS may be semi-static (e.g., based on RRC signaling) and enable the UE to perform channel estimations.

Figure 5:
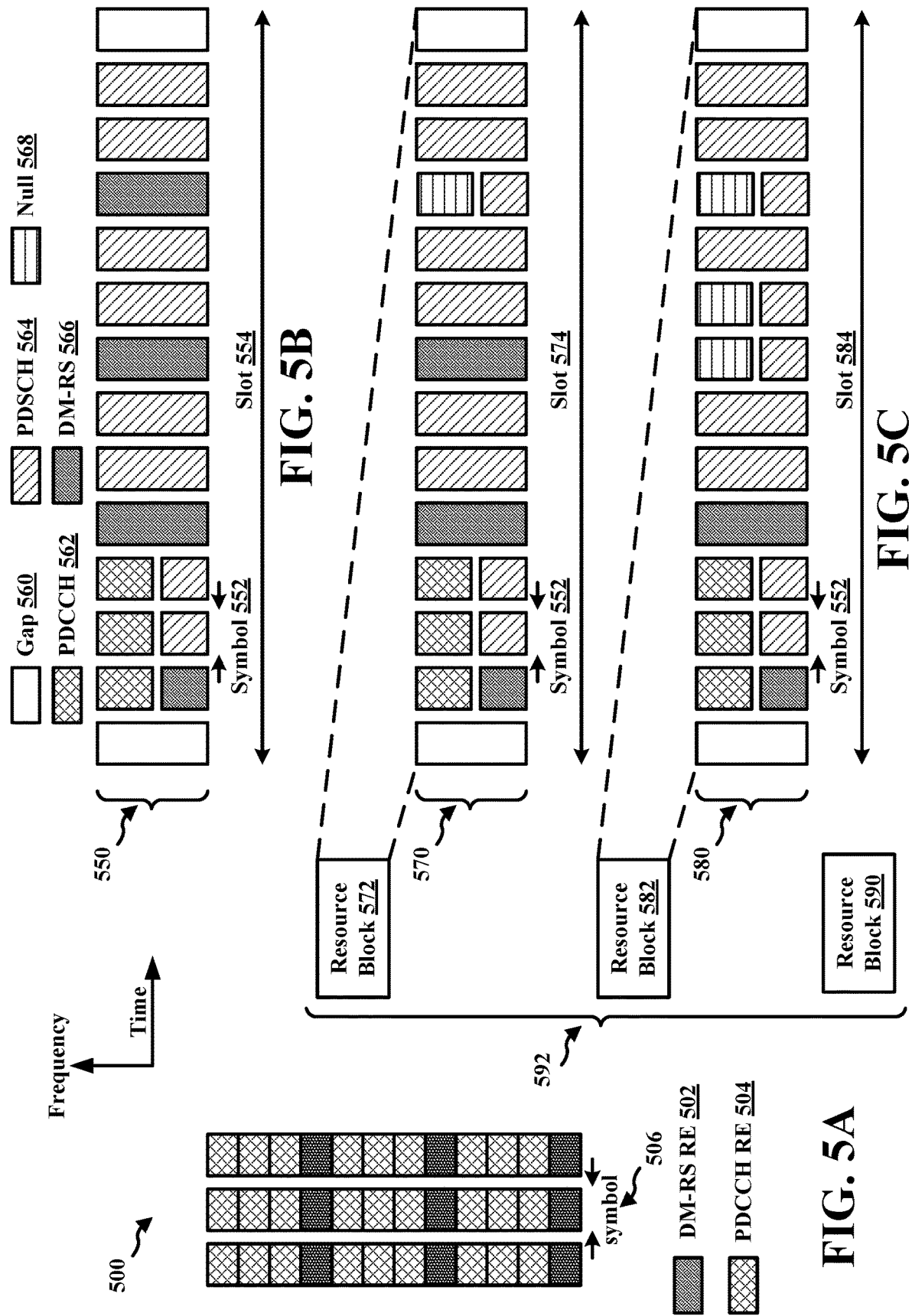
FIG. 5A illustrates an example sidelink control channel demodulation reference signal pattern in a frequency-domain, in accordance with aspects presented herein.
FIG. 5B illustrates an example slot structure in a time-domain, in accordance with aspects presented herein.
FIG. 5C illustrates an example first slot structure of a first resource block and a second slot structure of a second resource block, in accordance with aspects presented herein.

The DM-RS may be transmitted in combination with control channel transmissions and data channel transmissions. For example, demodulation reference signals may be transmitted with PDCCH transmissions and/or PDSCH transmissions. Demodulation reference signals may be present in symbols and may be placed in a pattern. For example, FIG. 5A illustrates an example DM-RS pattern 500 in a frequency-domain (FD) for a PDCCH transmission. The example DM-RS pattern 500 includes DM-RS resource elements 502 and PDCCH resource elements 504. In the illustrated example DM-RS pattern 500 of FIG. 5A, the DM-RS resource elements 502 are placed at every fourth resource element of a PDCCH symbol 506 (e.g., a symbol containing PDSCH resource elements). That is, the DM-RS resource elements 502 may occupy a quarter (25%) of the resource elements within the resource blocks used by a PDCCH transmission. However, in other examples, the positioning of DM-RS resource elements in a PDCCH symbol may be different. The DM-RS resource elements 502 may be drawn from (or derived from) a Gold sequence. Additionally, it may be appreciated that a DM-RS pattern may be configured for PDSCH transmissions in which DM-RS resource elements may partially occupy or fully occupy PDSCH symbols of a PDSCH transmission.

FIG. 5B illustrates an example slot structure 550 in a time-domain (TD), as presented herein. The example slot structure 550 include symbols 552 in a slot 554. Each of the symbols 552 in a slot may be associated with control information (e.g., PDCCH 562), data (e.g., PDSCH 564), demodulation reference signals (e.g., DM-RS 566), or a gap (e.g., gap 560). For example, in the example slot structure 550, a first symbol and a last symbol are guard symbols including a gap 560. The guard symbols including the gap 560 provide a switching time to allow the receiving device to facilitate switching between transmission/reception (and vice versa), and to facilitate switching between downlink/uplink transmissions and sidelink (and vice versa).

In some examples, a symbol may include control information, data, and/or DM-RS. For example, in the slot structure 550, a third symbol and a fourth symbol each include a control portion (e.g., PDCCH 562) and a data portion (e.g., PDSCH 564). Additionally, a second symbol includes a control portion (e.g., PDCCH 562) and a DM-RS portion (e.g., DM-RS 566). As shown in FIG. 5B, a fifth symbol, an eighth symbol, and an eleventh symbol are DM-RS symbols. It may be appreciated that other examples may include additional or alternative DM-RS patterns.

In some examples, the semi-static placement of the DM-RS may not be configured to address the different conditions of a particular deployment environment of the UE. For example, interference at the deployment environment of the UE that overlaps with one or more DM-RS resource elements may result in the respective DM-RS resource elements being unusable for demodulation and/or may provide inaccurate estimates for demodulation.

In aspects disclosed herein, over time, the UE may utilize a neural network to learn resources that can be used for interference measurement for demodulation. The UE may indicate the learned resources to the base station, which may use the indicated resources for determining resources on which to schedule null tones for reception at the UE.

As disclosed herein, a machine-learning component or a neural network may be trained over time using the semi-static placement of the DM-RS and measurements performed on downlink transmissions, for example, including control information and/or data, to determine a set of one or more resources to be used as null resources for demodulation within a particular deployment environment. The one or more resources may be different than the semi-static placement of the DM-RS.

Additionally, the one or more resources may be determined to improve a metric of interest. For example, the locations of the one or more resources may be selected to improve throughput for data and control information.

For example, a first set of one or more resources may be determined for an indoor environment, and a second set of one or more resources may be determined for an outdoor environment. As another example, a first set of one or more resources may be determined for a cell edge environment, and a second set of one or more resources may be determined for an environment that is closer to the base station.

Thus, the UE may utilize a neural network to learn over time an improved placement of resources (e.g., null resources) based on a deployment or environment of the UE. Machine-learning may be performed at the UE to execute training procedures based on the semi-static placement of DM-RS. Such training procedures may provide an improved/modified placement of null resources to be used for demodulation for certain deployment environments. The UE may provide feedback to the base station indicative of the locations of the null resources, which may be used by the base station in place of the semi-static placement of DM-RS.

The UE may determine the improved/modified placement of null resources to be used for demodulation at an increased level of granularity via machine-learning. For example, the UE determine the improved/modified placement of null resources at a single slot level or at a single resource block level. In some examples, the UE may determine the improved/modified placement of null resources across multiple slots or across multiple resources blocks.

FIG. 5C illustrates an example first slot structure 570 of a first resource block 572 and a second slot structure 580 of a second resource block 582, as presented herein. The first resource block 572 and the second resource block 582 may be part of a subframe of a frame, as described in connection with the examples of FIGS. 2A-2D. The example first slot structure 570 and the example second slot structure 580 include an improved placement of resources. For example, the placement of the resources of the first slot structure 570 and the second slot structure 580 may be indicated by the UE and may be based on a deployment or environment of the UE.

Similar to the example slot structure 550 of FIG. 5B, the example first slot structure 570 and the example second slot structure 580 include symbols 552 in respective slots 574, 584, and each of the symbols 552 in a slot may be associated with control information (e.g., PDCCH 562), data (e.g., PDSCH 564), demodulation reference signals (e.g., DM-RS 566), or a gap (e.g., gap 560). For example, in the first slot structure 570 and the second slot structure 580, a first symbol, a second symbol, a third symbol, and a fourth symbol each have a same resource allocation as the example slot structure 550 of FIG. 5B.

As shown in FIG. 5C, the first slot structure 570 and the second slot structure 580 include null resources 568. The null resources 568 may include one or more null tones of a symbol. The null resources 568 may refer to a non-transmission on one or more tones of a symbol. For example, in the example of FIG. 5C, an eleventh symbol of the first slot structure 570 includes a data portion (e.g., PDSCH 564) and a null portion (e.g., null resources 568). In the example second slot structure 580, an eighth symbol, a ninth symbol, and an eleventh symbol include a data portion (e.g., PDSCH 564) and a null portion (e.g., null resources 568).

In some examples, the UE may determine the improved/ modified placement of null resources to be used for demodulation at an increased level of granularity via machine-learning. For example, the UE determine the improved/modified placement of null resources at a single slot level or at a single resource block level. For example, the UE may determine the first slot structure for the first resource block 572, may determine the second slot structure 580 for the second resource block 582, and may determine a third slot structure for a third resource block 590. In some examples, the UE may determine the improved/modified placement of null resources across multiple slots or across multiple resources blocks. For example, the UE may determine the first slot structure 570 for the first resource block 572, and may determine the second slot structure 580 for the second resource block 582 and the third resource block 590. In some examples, the first resource block 572, the second resource block 582, and the third resource block 590 may be part of a resource allocation 592. Thus, the UE may determine the locations of the null resources 568 for the resource allocation 592.

Figure 6:
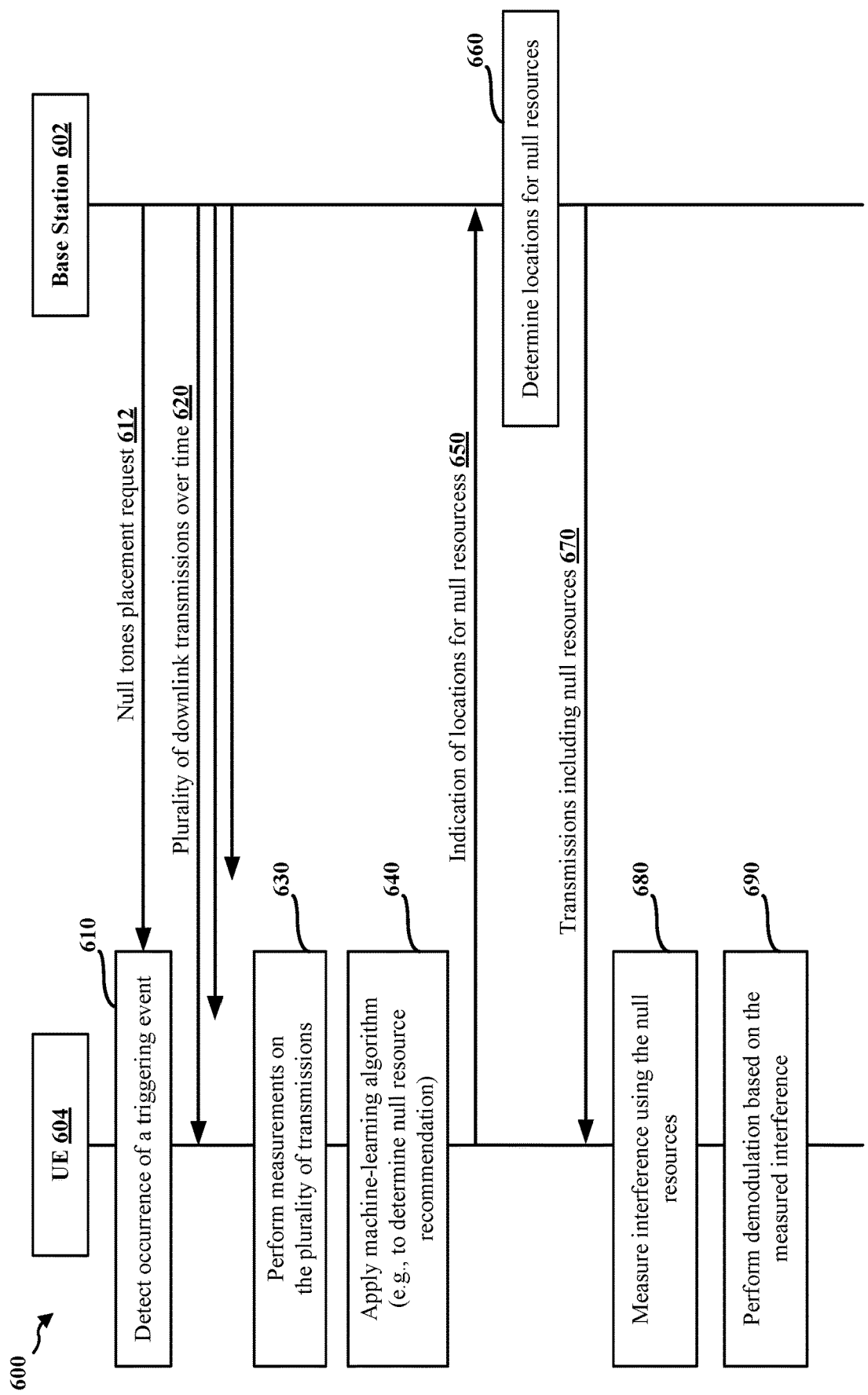
FIG. 6 is an example communication flow between a base station and a UE, in accordance with the teachings disclosed herein.

FIG. 6 illustrates an example communication flow 600 between a base station 602 and a UE 604, as presented herein. In the illustrated example, the communication flow 600 facilitates the UE 604 to indicate null tone placement for demodulation. Aspects of the base station 602 may be implemented by the base station 102/180 of FIG. 1 and/or the base station 310 of FIG. 3. Aspects of the UE 604 may be implemented by the UE 104 of FIG. 1 and/or the UE 350 of FIG. 3. Although not shown in the illustrated example of FIG. 6, it may be appreciated that in additional or alternative examples, the base station 602 may be in communication with one or more other base stations or UEs, and/or the UE 604 may be in communication with one or more other base stations or UEs.

The UE 604 may correspond to the UE 402 of FIG. 4. Although FIG. 6 is described in connection with a UE 604 and a base station 602 in order to illustrate the concept, the aspects may be similarly applied for a UE 604 and a TRP and/or for a UE 604 and another UE.

As shown in FIG. 6, the UE 604 receives, at 620, a plurality of downlink transmissions over a time period from the base station 602. The base station 602 may use one or more resource elements for the plurality of downlink transmissions. A resource element may comprise a frequency aspect (e.g. a tone) and a time aspect (e.g., a symbol). The plurality of downlink transmissions, at 620, may comprise one or more tones (or frequency subcarriers). The plurality of downlink transmissions, at 620, may include data, control information, reference signals, and/or null tones.

At 630, the UE 604 may perform measurements on the plurality of downlink transmissions received over time, at 620, from the base station 602. The measurements performed, at 630, may be indicative of a signal strength and/or quality associated with resources on which the plurality of downlink transmissions were received from the base station 602. In some examples, the measurements performed, at 630, may include Doppler estimates.

At 640, the UE 604 may apply a machine-learning algorithm, neural network, deep learning, or advanced signal processing techniques, for example, to determine resources to recommend for null resource placement. As illustrated in FIG. 4, measurements 408 may be input to the neural network 406. In some aspects, DM-RS 410 may also be input to the neural network 406, e.g., to be used similar to a pilot signal in determining resources to recommend for null resource placement. In some examples, the recommended null resources may be determined by optimizing a metric of interest. For example, the determination of the recommended null resources may be based on increasing throughput by identifying the placement of DM-RS, data tones, and null tones. The determination of the recommended null resources may be based on DM-RS (e.g., a predefined or fixed DM-RS pattern) as well as the measurements performed, at 630, on the plurality of downlink transmissions received over time (e.g., at 620). The determination may be based on any of the aspects of machine-learning, neural networks, or deep learning that are described in connection with FIG. 4, for example, to output 412 information about tone placement for DM-RS, data tones, and null tones. In some examples, the tone placement may be at a single slot level or a single resource block level. In some examples, the tone placement may be across multiple slots or across multiple resource blocks. In some examples, the tone placement may correspond to a resource allocation for the UE 604. In some aspects, the neural network, or a machine-learning component, may output a set of resources (e.g., a set of recommend tone placements) including locations for null tones.

As shown in FIG. 6, the UE 604 may transmit an indication of locations for null resources 650 to the base station 602. The indication of locations for null resources 650 may include one or more locations for one or more null tones that may facilitate improving a metric of interest, such as throughput. The UE 604 may transmit the indication of locations for null resources 650 via uplink control information (UCI), a MAC-control element (MAC-CE), and/or RRC signaling. FIG. 4 similarly illustrates the UE 402 indicating, at 414, a set of recommended resources to be used as null resources. The UE may use the null resources to perform demodulation. In some aspects, the indication may comprise resources for DM-RS, resources for data (e.g., data tones), and resources for null tones.

At 660, the base station 602 may determine locations for null resources to transmit to the UE 604. For example, based on the indication of locations for null resources 650, the base station 602 may determine a placement for DM-RS, data, and null resources.

As shown in FIG. 6, the base station 602 transmits transmissions 670 that are received by the UE 604. The transmissions 670 may include null resources based on the indication of locations for null resources 650. FIG. 4 similarly illustrates, at 416, that the second device 404 may use the indication 414 to schedule communication with the UE 402, e.g., transmitting downlink transmissions including null resources based on the information received from the UE 402.

At 680, the UE 604 measures interference using the null resources of the transmissions 670. For example, the UE 604 may use the null resources to measure interference and/or noise experienced for the channel. At 690, the UE 604 performs demodulation based on the measured interference (e.g., at 680).

In some examples, the UE 604 may perform (or update) the determining of the null resource recommendation based on an occurrence of a triggering event. For example, at 610, the UE 604 may detect the occurrence of a triggering event. In some examples, the UE 604 may retrain the machine-learning algorithm, neural network, deep learning, or advanced signal processing techniques based on the occurrence of the triggering event.

In some examples, the triggering event may include determining a change in channel conditions. For example, the UE 604 may determine a UE mobility status change. In some examples, the triggering event may include receiving a request from the base station 602. For example, the base station 602 may transmit a null tones placement request 612 requesting that the UE 604 provide a recommendation for null tone placement. In such examples, the performing of the determining of the null resource recommendation (e.g., at 640) and the transmitting of the indication of locations for null resources 650 may be on-demand.

As described above, in a wireless communication environment, a set of resources may be allocated for UL transmissions and/or DL transmissions between the UE 604 and the base station 602. For some deployment environments of the UE 604, the allocated resources may result in interference at the UE 604. The UE 604 may use demodulation reference signals (DM-RS) to measure channel conditions and to help demodulate the channel. For example, the UE 604 may use DM-RS for a DL control channel to estimate the propagation channel experienced by the DL control channel. The UE 604 may use the resultant information to help demodulate the DL control channel and to subsequently decode downlink control information. The configuration (or placement) of the DM-RS may be semi-static (e.g., based on RRC signaling) and enable the UE 604 to perform channel estimations. In aspects disclosed herein, over time, the UE 604 may utilize a neural network to learn resources that can be used for interference measurement for demodulation. The UE 604 may indicate the learned resources to the base station 602, which may use the indicated resources for determining resources on which to schedule null tones for reception at the UE 604.

In some examples, the semi-static placement of the DM-RS may not be configured to address the different conditions of a particular deployment environment of the UE 604. As disclosed herein, a machine-learning component or a neural network may be trained over time using the semi-static placement of the DM-RS and measurements performed on downlink transmissions, for example, including control information and/or data, to determine a set of one or more resources to be used as null resources for demodulation within a particular deployment environment. The one or more resources may be different than the semi-static placement of the DM-RS. Additionally, the one or more resources may be determined to improve a metric of interest. For example, the locations of the one or more resources may be selected to improve throughput for data and control information.

For example, a first set of one or more resources may be determined for an indoor environment, and a second set of one or more resources may be determined for an outdoor environment. As another example, a first set of one or more resources may be determined for a cell edge environment, and a second set of one or more resources may be determined for an environment that is closer to the base station.

Thus, the UE 604 may utilize a neural network to learn over time an improved placement of resources (e.g., null resources) based on a deployment or environment of the UE 604. Machine-learning may be performed at the UE 604 to execute training procedures based on the semi-static placement of DM-RS. Such training procedures may provide an improved/modified placement of null resources to be used for demodulation for certain deployment environments. The UE 604 may provide feedback to the base station 602 indicative of the locations of the null resources, which may be used by the base station 602 in place of the semi-static placement of DM-RS. The UE 604 may determine the improved/modified placement of null resources to be used for demodulation at an increased level of granularity via machine-learning. For example, the UE 604 determine the improved/modified placement of null resources at a single slot level or at a single resource block level. In some examples, the UE 604 may determine the improved/modified placement of null resources across multiple slots or across multiple resources blocks.

Figure 7:
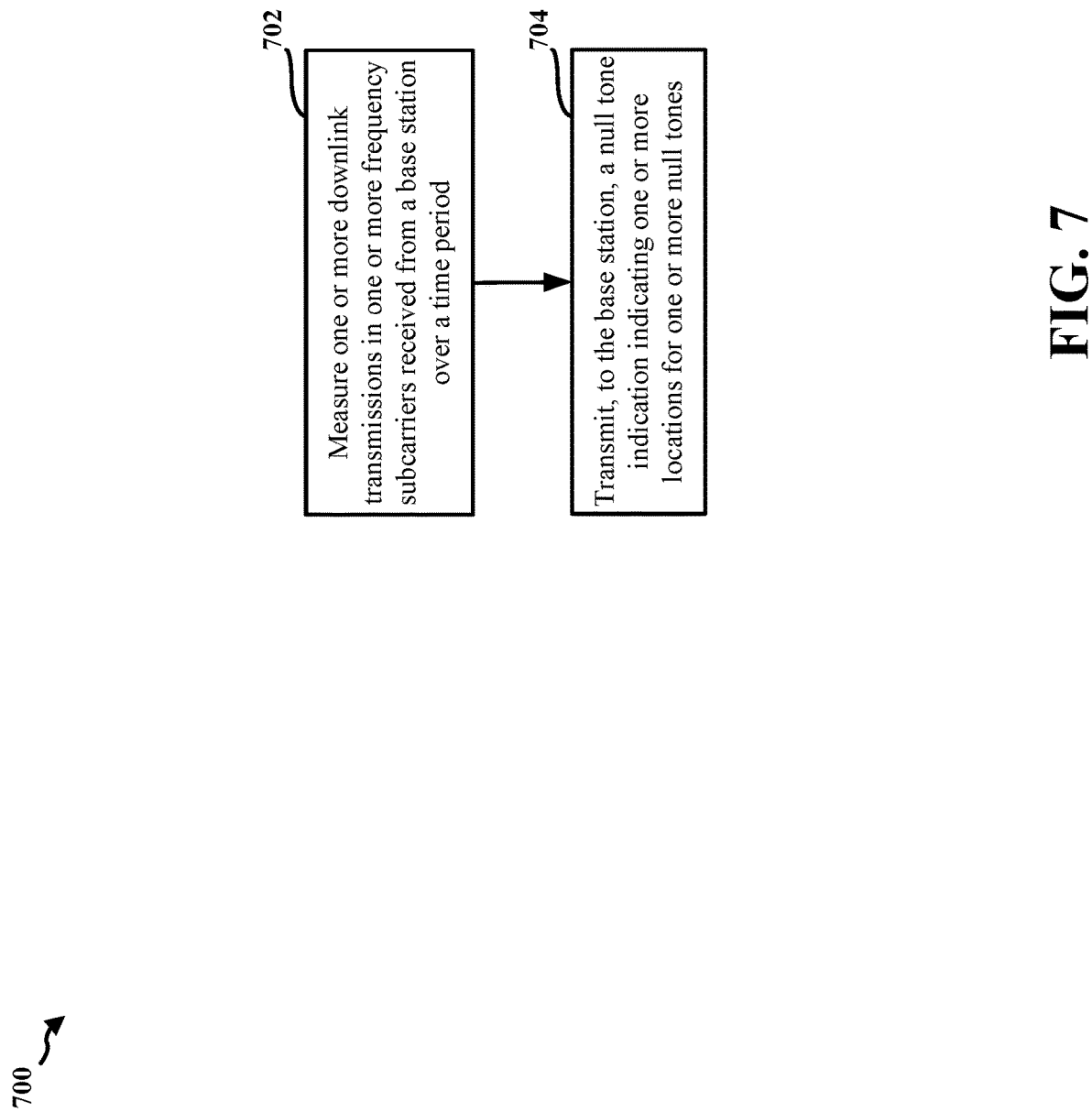
FIG. 7 is a flowchart of a method of wireless communication at a UE, in accordance with the teachings disclosed herein.

FIG. 7 is a flowchart 700 of a method of wireless communication. The method may be performed by a UE (e.g., the UE 104, the UE 350, and/or an apparatus 902 of FIG. 9). The method may facilitate improving cell coverage and/or increased throughput by enabling the UE to indicate proposed tone locations for null tones that can be used for interference measurement for demodulation.

At 702, the UE measures one or more downlink transmissions in one or more frequency subcarriers received from a base station over a time period, as described in connection with 630 of FIG. 6. For example, 702 may be performed by a measurement component 940 of the apparatus 902 of FIG. 9.

At 704, the UE transmits, to the base station, a null tone indication indicating one or more locations for one or more null tones, as described in connection with the indication of locations for null resources 650 of FIG. 6. For example, 704 may be performed by an indication component 942 of the apparatus 902 of FIG. 9. The one or more locations for the one or more null tones may be based at least in part on measurements performed on the one or more downlink transmissions received over the time period. In some examples, the UE may transmit the null tone indication using uplink control information. In some examples, the UE may transmit the null tone indication using a MAC-CE. In some examples, the UE may transmit the null tone indication using RRC signaling.

In some examples, the one or more locations for the one or more null tones may be associated with a resource allocation. In some examples, the one or more locations for the one or more null tones may be associated with a single slot or a single resource block. In some examples, the one or more locations for the one or more null tones may be across multiple slots or across multiple resource blocks.

Figure 8:
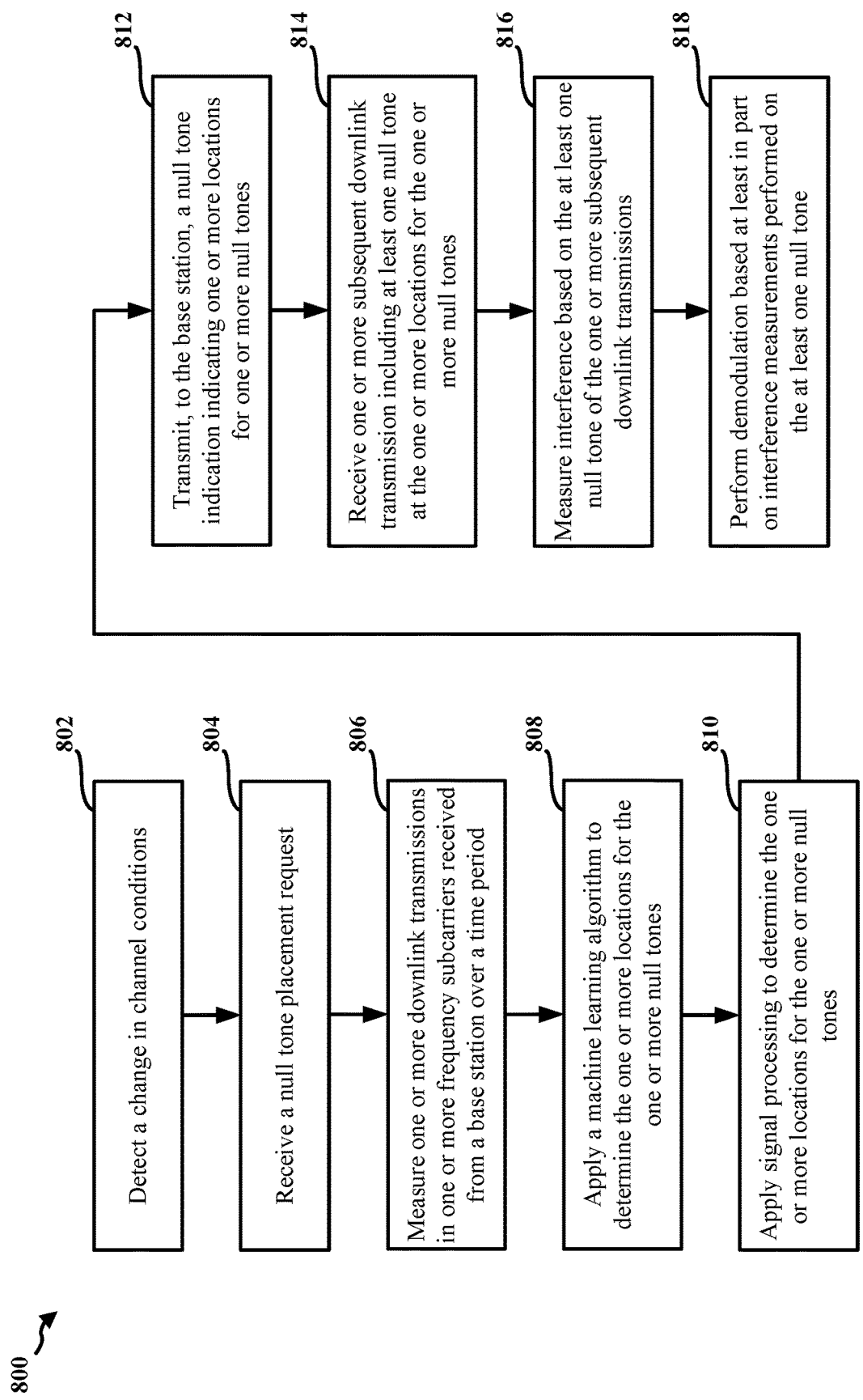
FIG. 8 is a flowchart of a method of wireless communication at a UE, in accordance with the teachings disclosed herein.

FIG. 8 is a flowchart 800 of a method of wireless communication. The method may be performed by a UE (e.g., the UE 104, the UE 350, and/or an apparatus 902 of FIG. 9). The method may facilitate improving cell coverage and/or increased throughput by enabling the UE to indicate proposed tone locations for null tones that can be used for interference measurement for demodulation.

At 806, the UE measures one or more downlink transmissions in one or more frequency subcarriers received from a base station over a time period, as described in connection with 630 of FIG. 6. For example, 806 may be performed by a measurement component 940 of the apparatus 902 of FIG. 9.

At 812, the UE transmits, to the base station, a null tone indication indicating one or more locations for one or more null tones, as described in connection with the indication of locations for null resources 650 of FIG. 6. For example, 812 may be performed by an indication component 942 of the apparatus 902 of FIG. 9. The one or more locations for the one or more null tones may be based at least in part on measurements performed on the one or more downlink transmissions received over the time period. In some examples, the UE may transmit the null tone indication using uplink control information. In some examples, the UE may transmit the null tone indication using a MAC-CE. In some examples, the UE may transmit the null tone indication using RRC signaling.

In some examples, the one or more locations for the one or more null tones may be associated with a resource allocation. In some examples, the one or more locations for the one or more null tones may be associated with a single slot or a single resource block. In some examples, the one or more locations for the one or more null tones may be across multiple slots or across multiple resource blocks.

In some examples, the UE may apply, at 808, a machine-learning algorithm to determine the one or more locations for the one or null tones, as described in connection with 640 of FIG. 6. For example, 808 may be performed by a machine-learning component 950 of the apparatus 902 of FIG. 9. In some examples, the UE may apply, at 810, signal processing to determine the one or more locations for the one or more null tones, as described in connection with 640 of FIG. 6. For example, 810 may be performed by a signal processing component 952 of the apparatus 902 of FIG. 9. The UE may apply a machine-learning algorithm, neural network, deep learning, or advanced signal processing techniques, as described in FIG. 4 to determine the one or more locations for the one or more null tones.

At 814, the UE may receive, from the base station, one or more subsequent downlink transmissions, the one or more subsequent downlink transmissions including at least one null tone at the one or more locations for the one or more null tones, as described in connection with the transmissions 670 of FIG. 6. For example, 814 may be performed by a null tones component 944 of the apparatus 902 of FIG. 9.

At 816, the UE may measure interference at the UE based on the at least one null tone of the one or more subsequent downlink transmissions, as described in connection with 680 of FIG. 6. For example, 816 may be performed by an interference component 946 of the apparatus 902 of FIG. 9.

At 818, the UE may perform demodulation based at least in part on interference measurements performed on the at least one null tone, as described in connection with 690 of FIG. 6. For example, 818 may be performed by a demodulation component 948 of the apparatus 902 of FIG. 9.

In some examples, the UE may perform the measurements of the one or more downlink transmissions (e.g., at 806) based on an occurrence of a triggering event. For example, at 802, the UE may detect a change in channel conditions, as described in connection with 610 of FIG. 6. For example, 802 may be performed by the measurement component 940 of the apparatus 902 of FIG. 9. In other examples, the UE may receive, at 804, a null tone placement request from the base station, as described in connection with the null tones placement request 612 of FIG. 6. For example, 804 may be performed by a request component 954 of the apparatus 902 of FIG. 9. In some examples, the performing of the measurements of the one or more downlink transmissions (e.g., at 806) may cause the UE to retrain a neural network and/or update a recommendation for null tone placement.

Figure 9:
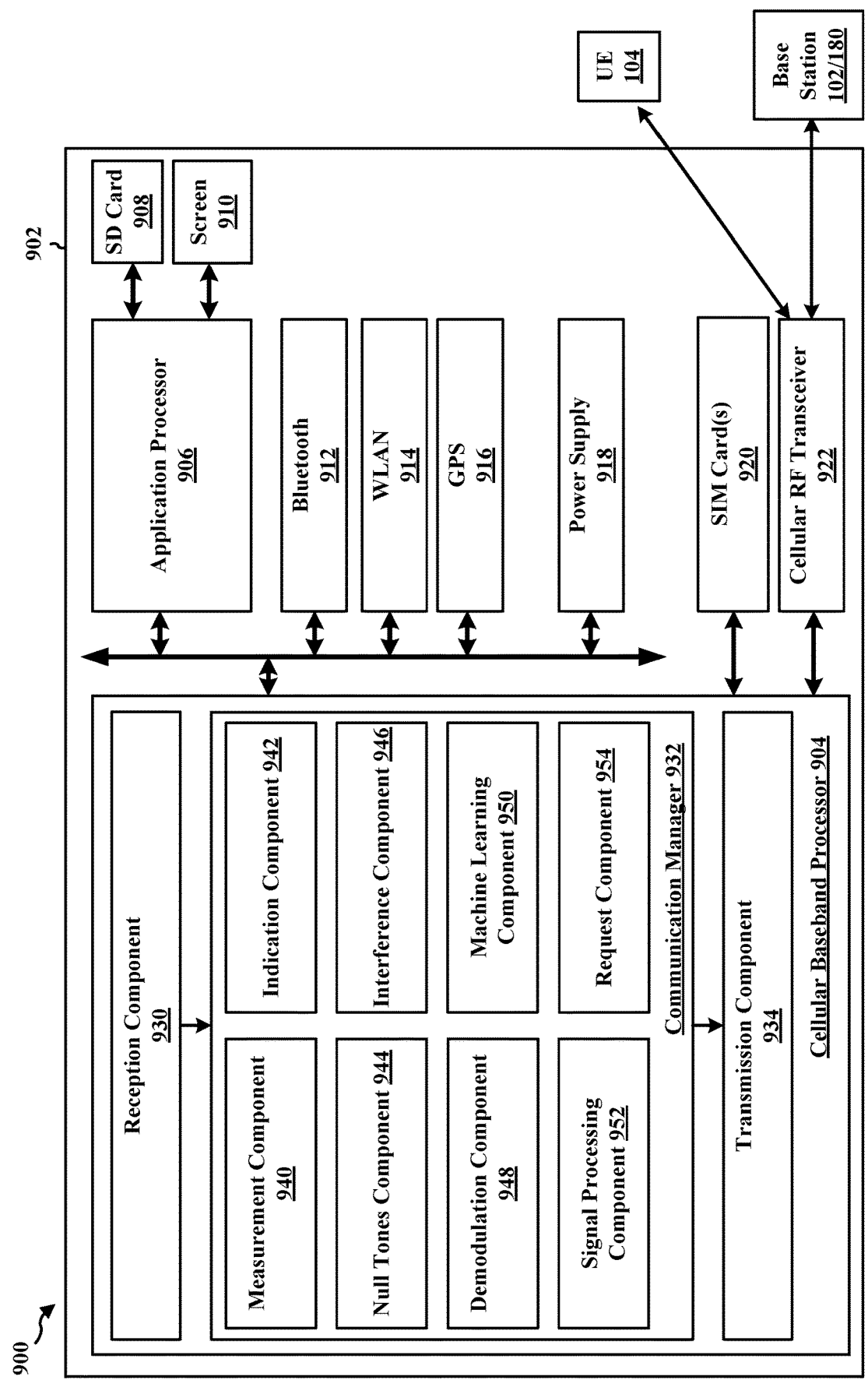
FIG. 9 is a diagram illustrating an example of a hardware implementation for an example apparatus, in accordance with the teachings disclosed herein.

FIG. 9 is a diagram 900 illustrating an example of a hardware implementation for an apparatus 902. The apparatus 902 may be a UE, a component of a UE, or may implement UE functionality. In some aspects, the apparatus 802 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or the base station 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the cellular baseband processor 904, and in another configuration, the apparatus 902 may be the entire UE (e.g., see the UE 350 of FIG. 3) and include the additional modules of the apparatus 902.

The communication manager 932 includes a measurement component 940 that is configured to measure one or more downlink transmissions in one or more frequency subcarriers received from a base station over a time period, for example, as described in connection with 702 of FIGS. 7 and/or 806 of FIG. 8. The example measurement component 940 may also be configured to detect a change in channel conditions, for example, as described in connection with 802 of FIG. 8.

The communication manager 932 also includes an indication component 942 that is configured to transmit, to the base station, a null tone indication indicating one or more locations for one or more null tones, for example, as described in connection with 704 of FIGS. 7 and/or 812 of FIG. 8.

The communication manager 932 also includes a null tones component 944 that is configured to receive one or more subsequent downlink transmission including null tones at the indicated locations, for example, as described in connection with 814 of FIG. 8.

The communication manager 932 also includes an interference component 946 that is configured to measure interference based on the at least one null tone of the one or more subsequent downlink transmissions, for example, as described in connection with 816 of FIG. 8.

The communication manager 932 also includes a demodulation component 948 that is configured to perform demodulation based at least in part on interference measurements on the at least one null tone, for example, as described in connection with 818 of FIG. 8.

The communication manager 932 also includes a machine-learning component 950 that is configured to apply a machine-learning algorithm to determine the one or more locations for the one or more null tones, for example, as described in connection with 808 of FIG. 8.

The communication manager 932 also includes a signal processing component 952 that is configured to apply signal processing to determine the one or more locations for the one or more null tones, for example, as described in connection with 810 of FIG. 8.

The communication manager 932 also includes a request component 954 that is configured to receive a null tone placement request, for example, as described in connection with 804 of FIG. 8.

The apparatus may include additional components that perform each of the blocks of the algorithm in the flowcharts of FIG. 7 and/or FIG. 8. As such, each block in the flowcharts of FIG. 7 and/or FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for measuring one or more downlink transmissions in one or more frequency subcarriers received from a base station over a time period. The example apparatus 902 also includes means for transmitting, to the base station, a null tone indication indicating one or more locations for one or more null tones, the one or more locations for the one or more null tones based at least in part on measurements performed on the one or more downlink transmissions received over the time period.

In another configuration, the example apparatus 902 also includes means for receiving, from the base station, one or more subsequent downlink transmissions, the one or more subsequent downlink transmissions including at least one null tone at the one or more locations for the one or more null tones. The example apparatus 902 also includes means for measuring interference at the UE based on the at least one null tone of the one or more subsequent downlink transmissions. The example apparatus 902 also includes means for performing demodulation based at least in part on interference measurements performed on the at least one null tone.

In another configuration, the example apparatus 902 also includes means for applying a machine-learning algorithm to determine the one or more locations for the one or more null tones.

In another configuration, the example apparatus 902 also includes means for applying signal processing to determine the one or more locations for the one or more null tones.

In another configuration, the example apparatus 902 also includes means for detecting a change in channel conditions. The example apparatus 902 also includes means for performing the measurements on the one or more downlink transmissions received over the time period based on the change in the channel conditions.

In another configuration, the example apparatus 902 also includes means for receiving a null tone placement request from the base station. The example apparatus 902 also includes means for performing the measurements on the one or more downlink transmissions received over the time period based on the null tone placement request.

In another configuration, the example apparatus 902 also includes means for transmitting the null tone indication using one or more of uplink control information, a MAC-CE, and RRC signaling.

The means may be one or more of the components of the apparatus 902 configured to perform the functions recited by the means. As described supra, the apparatus 902 may include the TX processor 368, the RX processor 356, and the controller/processor 359. As such, in one configuration, the means may be the TX processor 368, the RX processor 356, and the controller/processor 359 configured to perform the functions recited by the means.

Figure 10:
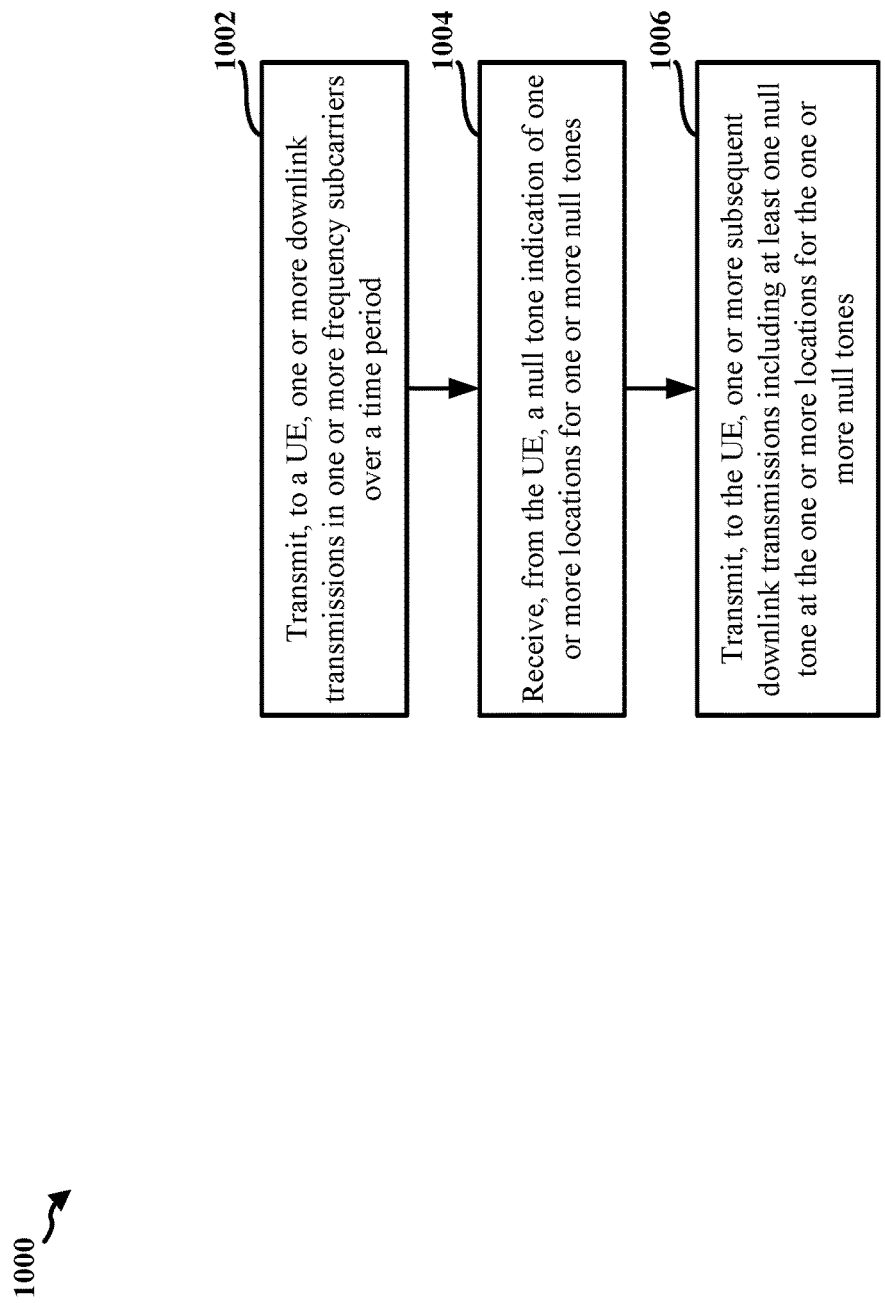
FIG. 10 is a flowchart of a method of wireless communication at a base station, in accordance with the teachings disclosed herein.

FIG. 10 is a flowchart 1000 of a method of wireless communication. The method may be performed by a base station (e.g., the base station 102/180, the base station 310, and/or an apparatus 1202 of FIG. 12). The method may facilitate improving cell coverage and/or increased throughput by transmitting null tones that can be used for interference measurement for demodulation based on an indication of proposed tone locations received from a UE.

At 1002, the base station transmits, to a UE, one or more downlink transmissions in one or more frequency subcarriers over a time period, as described in connection with the plurality of downlink transmissions over time at 620 of FIG. 6. For example, 1002 may be performed by transmission component 1234 and/or a downlink transmissions component 1240 of the apparatus 1202 of FIG. 12.

At 1004, the base station receives, from the UE, a null tone indication indicating one or more locations for one or more null tones, as described in connection with the indication of locations for null resources 650 of FIG. 6. For example, 1004 may be performed by a reception component 1230 and/or an indication component 1242 of the apparatus

Figure 12:
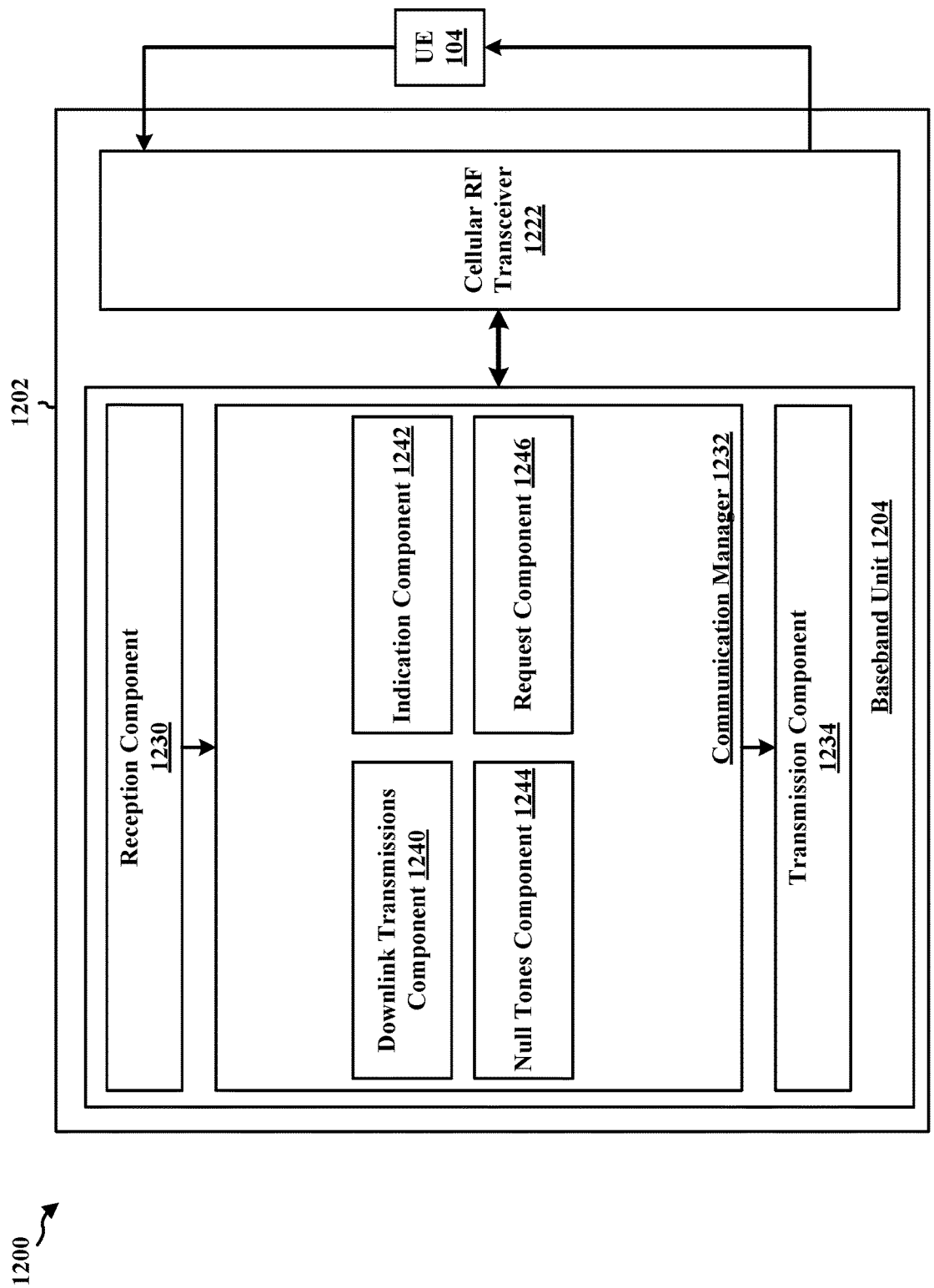
FIG. 12 is a diagram illustrating an example of a hardware implementation for an example apparatus, in accordance with the teachings disclosed herein.

1202 of FIG. 12. The base station may receive the null tone indication via uplink control information. In some examples, the base station may receive the null tone indication via a MAC-CE. In some examples, the base station may receive the null tone indication via RRC signaling.

In some examples, the one or more locations for the one or more null tones may be based on a machine-learning algorithm. In some examples, the one or more locations for the one or more null tones may be based on signal processing.

In some examples, the one or more locations for the one or more null tones may be associated with a resource allocation. In some examples, the one or more locations for the one or more null tones may be associated with a single slot or a single resource block. In some examples, the one or more locations for the one or more null tones may be across multiple slots or across multiple resource blocks.

In some examples, the base station may receive the null tone indication based on a change in channel conditions. In some examples, the base station may receive the null tone indication on-demand.

Figure 11:
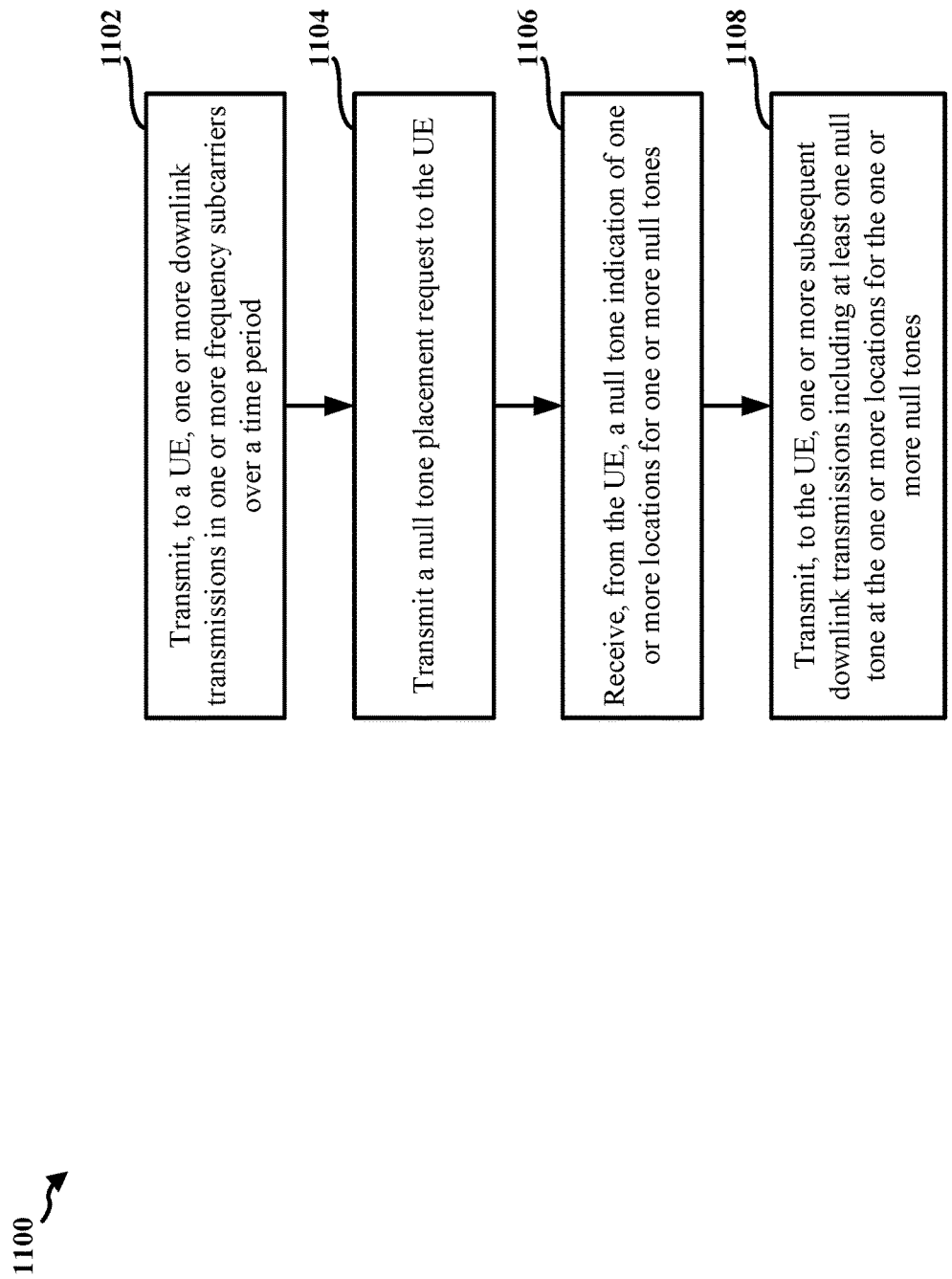
FIG. 11 is a flowchart of a method of wireless communication at a base station, in accordance with the teachings disclosed herein.

FIG. 11 is a flowchart 1100 of a method of wireless communication. The method may be performed by a base station (e.g., the base station 102/180, the base station 310, and/or an apparatus 1202 of FIG. 12). The method may facilitate improving cell coverage and/or increased throughput by transmitting null tones that can be used for interference measurement for demodulation based on an indication of proposed tone locations received from a UE.

At 1102, the base station transmits, to a UE, one or more downlink transmissions in one or more frequency subcarriers over a time period, as described in connection with the plurality of downlink transmissions over time at 620 of FIG. 6. For example, 1102 may be performed by transmission component 1234 and/or a downlink transmissions component 1240 of the apparatus 1202 of FIG. 12.

At 1106, the base station receives, from the UE, a null tone indication indicating one or more locations for one or more null tones, as described in connection with the indication of locations for null resources 650 of FIG. 6. For example, 1106 may be performed by a reception component 1230 and/or an indication component 1242 of the apparatus 1202 of FIG. 12. The base station may receive the null tone indication via uplink control information. In some examples, the base station may receive the null tone indication via a MAC-CE. In some examples, the base station may receive the null tone indication via RRC signaling.

In some examples, the one or more locations for the one or more null tones may be based on a machine-learning algorithm. In some examples, the one or more locations for the one or more null tones may be based on signal processing.

In some examples, the one or more locations for the one or more null tones may be associated with a resource allocation. In some examples, the one or more locations for the one or more null tones may be associated with a single slot or a single resource block. In some examples, the one or more locations for the one or more null tones may be across multiple slots or across multiple resource blocks.

In some examples, the base station may receive the null tone indication based on a change in channel conditions. In some examples, the base station may receive the null tone indication on-demand. For example, at 1104, the base station may transmit a null tone placement request to the UE, as described in connection with the null tones placement request 612 of FIG. 6. For example, 1104 may be performed by the transmission component 1234 and/or a null tones component 1244 of the apparatus 1202 of FIG. 12. In some such examples, the base station may receive, at 1106, the null tone indication of the one or more locations for the one or more null tones based on the null tone placement request.

At 1108, the base station transmits, to the UE, one or more subsequent downlink transmissions including at least one null tone at the one or more locations for the one or more null tones, as described in connection with the transmissions 670 of FIG. 6. For example, 1108 may be performed by the transmission component 1234 and/or a request component 1246 of the apparatus 1202 of FIG. 12.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a downlink transmissions component 1240 that is configured to, via the transmission component 1234, transmit, to a UE, one or more downlink transmissions in one or more frequency subcarriers over a time period, for example, as described in connection with 1002 of FIGS. 10 and/or 1102 of FIG. 11.

The communication manager 1232 also includes an indication component 1242 that is configured to, via the reception component 1230, receive, from the UE, a null tone indication indicating one or more locations for one or more null tones, for example, as described in connection with 1004 of FIGS. 10 and/or 1106 of FIG. 10.

The communication manager 1232 also includes a null tones component 1244 that is configured to, via the transmission component 1234, transmit, to the UE, one or more subsequent downlink transmissions including at least one null tone at the one or more locations for the one or more null tones, for example, as described in connection with 1006 of FIGS. 10 and/or 1108 of FIG. 11.

The communication manager 1232 also includes a request component 1246 that is configured to, via the transmission component 1234, transmit a null tone placement request to the UE, for example, as described in connection with 1104 of FIG. 11.

The apparatus may include additional components that perform each of the blocks of the algorithm in the flowcharts of FIG. 10 and/or FIG. 11. As such, each block in the flowcharts of FIG. 10 and/or FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for transmitting, to a UE, one or more downlink transmissions in one or more frequency subcarriers over a time period. The example apparatus 1202 also includes means for receiving, from the UE, a null tone indication indicating one or more locations for one or more null tones. The example apparatus 1202 also includes means for transmitting, to the UE, one or more subsequent downlink transmissions, the one or more subsequent downlink transmissions including at least one null tone at the one or more locations for the one or more null tones.

In another configuration, the example apparatus 1202 also includes means for receiving the null tone indication based on a change in channel conditions.

In another configuration, the example apparatus 1202 also includes means for transmitting a null tone placement request to the UE. The example apparatus 1202 also includes means for receiving the null tone indication based on the null tones placement request.

In another configuration, the example apparatus 1202 also includes means for receiving the null tone indication via one or more of uplink control information, a MAC-CE, and RRC signaling.

The means may be one or more of the components of the apparatus 1202 configured to perform the functions recited by the means. As described supra, the apparatus 1202 may include the TX processor 316, the RX processor 370, and the controller/processor 375. As such, in one configuration, the means may be the TX processor 316, the RX processor 370, and the controller/processor 375 configured to perform the functions recited by the means.

Aspects disclosed herein enable a UE to determine and provide a recommendation for null tone placement, which may facilitate improving communication performance, for example, by enabling the UE to use the null tones for demodulation. For example, aspects disclosed herein facilitate improving cell coverage and/or increased throughput by enabling the UE to indicate proposed tone locations for null tones that can be used for interference measurement for demodulation. Additionally, aspects disclosed herein facilitate improving cell coverage and/or increased throughput by enabling a base station to transmit null tones that can be used for interference measurement for demodulation at a UE based on an indication of proposed tone locations received from the UE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory, the memory and the at least one processor configured to measure one or more downlink transmissions in one or more frequency subcarriers received from a base station over a time period; and transmit, to the base station, a null tone indication indicating one or more locations for one or more null tones, the one or more locations for the one or more null tones based at least in part on measurements performed on the one or more downlink transmissions received over the time period.

Aspect 2 is the apparatus of aspect 1, further including that the memory and the at least one processor are further configured to: receive, from the base station, one or more subsequent downlink transmissions, the one or more subsequent downlink transmissions including at least one null tone at the one or more locations for the one or more null tones; measure interference at the UE based on the at least one null tone of the one or more subsequent downlink transmissions; and perform demodulation based at least in part on interference measurements performed on the at least one null tone.

Aspect 3 is the apparatus of any of aspects 1 and 2, further including that the memory and the at least one processor are further configured to: apply a machine-learning algorithm to determine the one or more locations for the one or more null tones.

Aspect 4 is the apparatus of any of aspects 1 and 2, further including that the memory and the at least one processor are further configured to: apply signal processing to determine the one or more locations for the one or more null tones.

Aspect 5 is the apparatus of any of aspects 1 to 4, further including that the one or more locations for the one or more null tones are associated with a resource allocation.

Aspect 6 is the apparatus of any of aspects 1 to 4, further including that the one or more locations for the one or more null tones are associated with a single slot or a single resource block.

Aspect 7 is the apparatus of any of aspects 1 to 4, further including that the one or more locations for the one or more null tones are across multiple slots or across multiple resource blocks.

Aspect 8 is the apparatus of any of aspects 1 to 7, further including that the memory and the at least one processor are further configured to: detect a change in channel conditions; and perform the measurements on the one or more downlink transmissions received over the time period based on the change in the channel conditions.

Aspect 9 is the apparatus of any of aspects 1 to 8, further including that the memory and the at least one processor are further configured to: receive a null tone placement request from the base station; and perform the measurements on the one or more downlink transmissions received over the time period based on the null tone placement request.

Aspect 10 is the apparatus of any of aspects 1 to 9, further including that the memory and the at least one processor are configured to transmit the null tone indication using one or more of uplink control information, a MAC-CE, and RRC signaling.

Aspect 11 is the apparatus of any of aspects 1 to 10, further including a transceiver coupled to the at least one processor.

Aspect 12 is a method of wireless communication for implementing any of aspects 1 to 11.

Aspect 13 is an apparatus for wireless communication including means for implementing any of aspects 1 to 11.

Aspect 14 is a non-transitory computer-readable storage medium storing computer executable code, where the code, when executed, causes a processor to implement any of aspects 1 to 11.

Aspect 15 is an apparatus for wireless communication at a base station including at least one processor coupled to a memory, the memory and the at least one processor configured to transmit, to a UE, one or more downlink transmissions in one or more frequency subcarriers over a time period; receive, from the UE, a null tone indication indicating one or more locations for one or more null tones; and transmit, to the UE, one or more subsequent downlink transmissions, the one or more subsequent downlink transmissions including at least one null tone at the one or more locations for the one or more null tones.

Aspect 16 is the apparatus of aspect 15, further including that the one or more locations for the one or more null tones is based on a machine-learning algorithm.

Aspect 17 is the apparatus of aspect 15, further including that the one or more locations for the one or more null tones is based on signal processing.

Aspect 18 is the apparatus of any of aspects 15 to 17, further including that the one or more locations for the one or more null tones are associated with a resource allocation.

Aspect 19 is the apparatus of any of aspects 15 to 17, further including that the one or more locations for the one or more null tones are associated with a single slot or a single resource block.

Aspect 20 is the apparatus of any of aspects 15 to 17, further including that the indicated locations for the one or more null tones are across multiple slots or across multiple resource blocks.

Aspect 21 is the apparatus of any of aspects 15 to 20, further including that the memory and the at least one processor are configured to receive the null tone indication based on a change in channel conditions.

Aspect 22 is the apparatus of any of aspects 15 to 21, further including that the memory and the at least one processor are further configured to: transmit a null tone placement request to the UE; and receive the null tone indication based on the null tone placement request.

Aspect 23 is the apparatus of any of aspects 15 to 22, further including that the memory and the at least one processor are configured to receive the null tone indication via one or more of uplink control information, a MAC-CE, and RRC signaling.

Aspect 24 is the apparatus of any of aspects 15 to 23, further including a transceiver coupled to the at least one processor.

Aspect 25 is a method of wireless communication for implementing any of aspects 15 to 24.

Aspect 26 is an apparatus for wireless communication including means for implementing any of aspects 15 to 24.

Aspect 27 is a non-transitory computer-readable storage medium storing computer executable code, where the code, when executed, causes a processor to implement any of aspects 15 to 24.

What is claimed is:

1. An apparatus for communication at a user equipment (UE), comprising:
    one or more memories; and
    one or more processors coupled to the one or more memories, the one or more processors configured to cause the UE to:
        measure one or more downlink transmissions in one or more frequency subcarriers received over a time period; and
        transmit a null tone indication that indicates one or more locations for one or more null tones associated with demodulation, wherein the one or more locations indicated for the one or more null tones are based at least in part on the measured one or more downlink transmissions and one or more demodulation reference signals (DM-RSs).

2. The apparatus of claim 1, further comprising:
    one or more transceivers coupled to the one or more processors, wherein the one or more processors are further configured to cause the UE to:
        receive one or more subsequent downlink transmissions, wherein the one or more subsequent downlink transmissions include at least one null tone at the one or more locations for the one or more null tones;
        measure interference at the UE based on the at least one null tone of the one or more subsequent downlink transmissions; and
        perform the demodulation based at least in part on the measured interference.

3. The apparatus of claim 1, wherein the one or more processors are further configured to cause the UE to:
apply a machine-learning algorithm to determine the one or more locations for the one or more null tones.

4. The apparatus of claim 1, wherein the one or more processors are further configured to cause the UE to:
apply signal processing to determine the one or more locations for the one or more null tones.

5. The apparatus of claim 1, wherein the one or more locations for the one or more null tones are associated with a resource allocation.

6. The apparatus of claim 1, wherein the one or more locations for the one or more null tones are associated with a single slot or a single resource block.

7. The apparatus of claim 1, wherein the one or more locations for the one or more null tones are across multiple slots or across multiple resource blocks.

8. The apparatus of claim 1, wherein the one or more processors are further configured to cause the UE to:
detect a change in one or more channel conditions, wherein to measure the one or more downlink transmissions received over the time period, the one or more processors are configured to cause the UE to measure the one or more downlink transmissions received over the time period based on the change in the one or more channel conditions.

9. The apparatus of claim 1, wherein the one or more processors are further configured to cause the UE to:
receive a null tone placement request from a base station, wherein to measure the one or more downlink transmissions received over the time period, the one or more processors are configured to cause the UE to measure the one or more downlink transmissions received over the time period based on the null tone placement request.

10. The apparatus of claim 1, wherein to transmit the null tone indication, the one or more processors are further configured to cause the UE to:
transmit the null tone indication in one or more of uplink control information, a medium access control-control element (MAC-CE), or radio resource control signaling.

11. The apparatus of claim 1, wherein the one or more processors are configured, individually or in combination, to measure the one or more downlink transmissions in the one or more frequency subcarriers received over the time period, and transmit the null tone indication that indicates the one or more locations for the one or more null tones associated with the demodulation.

12. The apparatus of claim 1, wherein the one or more processors are further configured to cause the UE to:
learn the one or more locations for the one or more null tones based on the measured one or more downlink transmissions and the one or more DM-RSs, wherein to transmit the null tone indication, the one or more processors are configured to cause the UE to transmit the null tone indication based on the learned one or more locations for the one or more null tones.

13. The apparatus of claim 1, wherein the null tone indication recommends a placement for the one or more null tones for improvement of the demodulation at the UE, wherein the one or more locations for the one or more null tones are determined based at least in part on the measured one or more downlink transmissions and the one or more DM-RSs.

14. A method of wireless communication at a user equipment (UE), comprising:
measuring one or more downlink transmissions in one or more frequency subcarriers received over a time period; and
transmitting a null tone indication that indicates one or more locations for one or more null tones associated with demodulation, wherein the one or more locations indicated for the one or more null tones are based at least in part on the measured one or more downlink transmissions and one or more demodulation reference signals (DM-RSs).

15. The method of claim 14, further comprising:
receiving one or more subsequent downlink transmissions, the one or more subsequent downlink transmissions including at least one null tone at the one or more locations for the one or more null tones;
measuring interference at the UE based on the at least one null tone of the one or more subsequent downlink transmissions; and
performing the demodulation based at least in part on the measured interference.

16. The method of claim 14, further comprising:
applying a machine-learning algorithm to determine the one or more locations for the one or more null tones.

17. The method of claim 14, further comprising:
applying signal processing to determine the one or more locations for the one or more null tones.

18. The method of claim 14, further comprising:
detecting a change in one or more channel conditions, wherein measuring the one or more downlink transmissions received over the time period comprises measuring the one or more downlink transmissions received over the time period based on the change in the one or more channel conditions.

19. The method of claim 14, further comprising:
receiving a null tone placement request, wherein measuring the one or more downlink transmissions received over the time period comprises measuring the one or more downlink transmissions received over the time period based on the null tone placement request.

20. The method of claim 14, wherein transmitting the null tone indication comprises:
transmitting the null tone indication via one or more of uplink control information, a medium access control-control element (MAC-CE), or radio resource control signaling.

21. The method of claim 14, further comprising:
learning the one or more locations for the one or more null tones based on the measured one or more downlink transmissions and the one or more DM-RSs, wherein transmitting the null tone indication comprises transmitting the null tone indication based on the learned one or more locations for the one or more null tones.

22. An apparatus for wireless communication at a base station, comprising:
one or more memories; and
one or more processors coupled to the one or more memories, the one or more processors configured to cause the base station to:
transmit one or more downlink transmissions in one or more frequency subcarriers over a time period;
receive a null tone indication that indicates one or more locations for one or more null tones associated with demodulation, wherein the one or more locations for the one or more null tones are based at least in part on the one or more downlink transmissions and one or more demodulation reference signals (DM-RSs); and transmit one or more subsequent downlink transmissions, wherein the one or more subsequent downlink transmissions include at least one null tone at the one or more locations for the one or more null tones.

23. The apparatus of claim 22, wherein the one or more locations for the one or more null tones is based on a machine-learning algorithm.

24. The apparatus of claim 22, wherein the one or more locations for the one or more null tones is based on signal processing.

25. The apparatus of claim 22, wherein the one or more locations for the one or more null tones are associated with a resource allocation.

26. The apparatus of claim 22, wherein the one or more locations for the one or more null tones are associated with a single slot or a single resource block.

27. The apparatus of claim 22, wherein the one or more locations for the one or more null tones are across multiple slots or across multiple resource blocks.

28. The apparatus of claim 22, wherein to receive the null tone indication, the one or more processors are configured to cause the base station to:
receive the null tone indication based on a change in one or more channel conditions.

29. The apparatus of claim 22, further comprising:
one or more transceivers coupled to the one or more processors, wherein the one or more processors are further configured to cause the base station to:
transmit a null tone placement request to a user equipment (UE), wherein to receive the null tone indication, the one or more processors are configured to cause the base station to receive the null tone indication based on the null tone placement request.

30. The apparatus of claim 22, wherein to receive the null tone indication, the one or more processors are configured to cause the base station to:
receive the null tone indication via one or more of uplink control information, a medium access control-control element (MAC-CE), or radio resource control signaling.

31. The apparatus of claim 22, wherein the one or more processors are configured, individually or in combination, to transmit the one or more downlink transmissions in the one or more frequency subcarriers over the time period, receive the null tone indication that indicates the one or more locations for the one or more null tones associated with the demodulation, and transmit the one or more subsequent downlink transmissions.

32. The apparatus of claim 22, wherein the one or more locations for the one or more null tones are learned based on the one or more downlink transmissions and the one or more DM-RSs.

33. A method of wireless communication at a base station, comprising:
transmitting one or more downlink transmissions in one or more frequency subcarriers over a time period;
receiving a null tone indication that indicates one or more locations for one or more null tones associated with demodulation, wherein the one or more locations for the one or more null tones are based at least in part on the one or more downlink transmissions and one or more demodulation reference signals (DM-RSs); and
transmitting one or more subsequent downlink transmissions, the one or more subsequent downlink transmissions including at least one null tone at the one or more locations for the one or more null tones.

34. The method of claim 33, wherein the one or more locations for the one or more null tones is based on a machine-learning algorithm.

35. The method of claim 33, wherein receiving the null tone indication comprises:
receiving the null tone indication based on a change in one or more channel conditions.

36. The method of claim 33, further comprising:
transmitting a null tone placement request to a user equipment (UE), wherein receiving the null tone indication comprises receiving the null tone indication based on the null tone placement request.

37. The method of claim 33, wherein the one or more locations for the one or more null tones are learned based on the one or more downlink transmissions and the one or more DM-RSs.

38. A non-transitory computer-readable storage medium comprising computer executable code at a user equipment (UE), the computer executable code, when executed, causes one or more processors of the UE to:
measure one or more downlink transmissions in one or more frequency subcarriers received over a time period; and
transmit a null tone indication that indicates one or more locations for one or more null tones associated with demodulation, wherein the one or more locations indicated for the one or more null tones are based at least in part on the measured one or more downlink transmissions and one or more demodulation reference signals (DM-RSs).

39. A non-transitory computer-readable storage medium comprising computer executable code at a base station, the computer executable code, when executed, causes one or more processors of the base station to:
transmit one or more downlink transmissions in one or more frequency subcarriers over a time period;
receive a null tone indication that indicates one or more locations for one or more null tones associated with demodulation, wherein the one or more locations for the one or more null tones are based at least in part on the one or more downlink transmissions and one or more demodulation reference signals (DM-RSs); and
transmit one or more subsequent downlink transmissions, the one or more subsequent downlink transmissions including at least one null tone at the one or more locations for the one or more null tones.

* * * * *